(12) United States Patent
Tang et al.

(10) Patent No.: US 8,150,264 B2
(45) Date of Patent: Apr. 3, 2012

(54) METHODS FOR NON-WAVELENGTH-CONVERTING MULTI-LANE OPTICAL SWITCHING

(75) Inventors: Wenjing Tang, Houston, TX (US); Yuhua Chen, Houston, TX (US)

(73) Assignee: University of Houston, Houston, TX (US)

( * ) Notice: Subject to any disclaimer, the term of this patent is extended or adjusted under 35 U.S.C. 154(b) by 797 days.

(21) Appl. No.: 12/268,199

(22) Filed: Nov. 10, 2008

(65) Prior Publication Data

US 2009/0148162 A1 Jun. 11, 2009

Related U.S. Application Data

(60) Provisional application No. 60/986,818, filed on Nov. 9, 2007.

(51) Int. Cl.
*H04J 14/02* (2006.01)
*H04J 14/00* (2006.01)

(52) U.S. Cl. ............... 398/82; 398/83; 398/45; 398/48; 370/389; 370/465; 385/16; 385/24

(58) Field of Classification Search ............... 398/5, 25, 398/45–54, 59, 82, 83, 177; 370/252, 351, 370/389, 417, 465, 535; 385/16, 24, 45
See application file for complete search history.

(56) References Cited

U.S. PATENT DOCUMENTS

| | | | |
|---|---|---|---|
| 6,433,900 B1 * | 8/2002 | Kuroyanagi et al. | ........... 398/19 |
| 6,671,256 B1 | 12/2003 | Xiong et al. | |
| 6,721,315 B1 | 4/2004 | Xiong et al. | |
| 6,871,021 B2 * | 3/2005 | Graves et al. | ................... 398/45 |
| 6,922,501 B2 * | 7/2005 | Beshai et al. | ................... 385/24 |
| 6,956,868 B2 | 10/2005 | Qiao | |
| 7,106,966 B1 * | 9/2006 | Lalonde et al. | ................. 398/46 |
| 7,236,699 B2 * | 6/2007 | Beshai et al. | ................... 398/45 |
| 7,280,758 B2 * | 10/2007 | Doh et al. | ........................ 398/59 |
| 7,620,044 B2 * | 11/2009 | Choi et al. | ..................... 370/389 |
| 2007/0242691 A1 * | 10/2007 | Rhee et al. | ..................... 370/465 |
| 2009/0274459 A1 * | 11/2009 | Takita | ............................. 398/48 |
| 2010/0142942 A1 * | 6/2010 | Rhee et al. | ...................... 398/25 |

\* cited by examiner

*Primary Examiner* — Loha Ben
(74) *Attorney, Agent, or Firm* — Winstead PC

(57) ABSTRACT

A method for providing multi-wavelength switching. The method comprising receiving a plurality of signals through at least one input port, and separating the plurality of said signals into at least one wavelength signal set based on wavelengths, wherein a first wavelength signal set of said at least one wavelength signal sets corresponds to a first wavelength. The method further comprises providing a plurality of output lanes to at least one output port, and determining if two signals from said first wavelength signal set traveling on said first wavelength are scheduled output from an output port during an overlapping time period through said plurality of output lanes. The method further comprises determining if one of said plurality of output lanes is available during said overlapping time period when said two signals are schedule for said output port during the overlapping time period, wherein a first signal of said two signals is routed for output on an available lane if one of said plurality of output lanes of said output port is available.

20 Claims, 46 Drawing Sheets

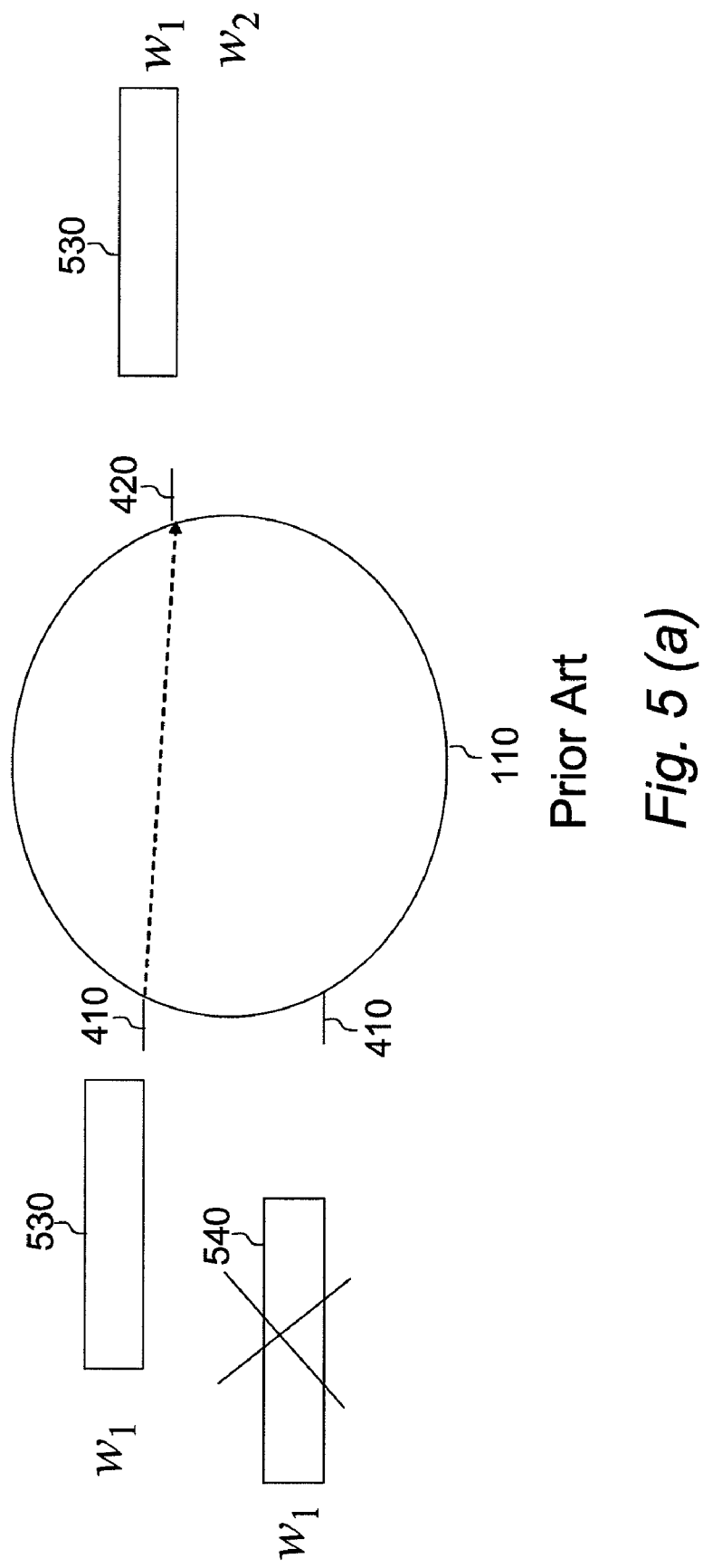

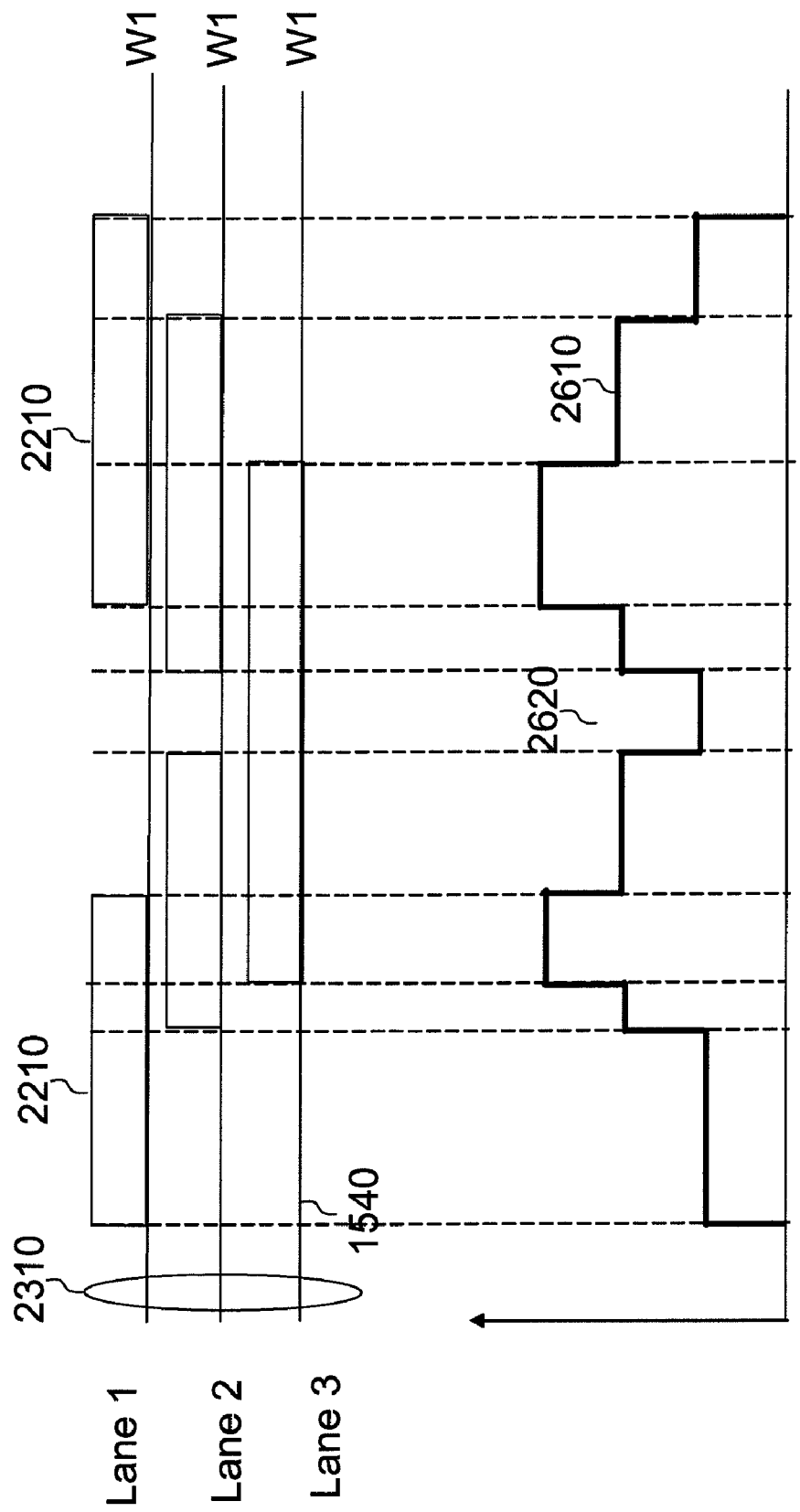

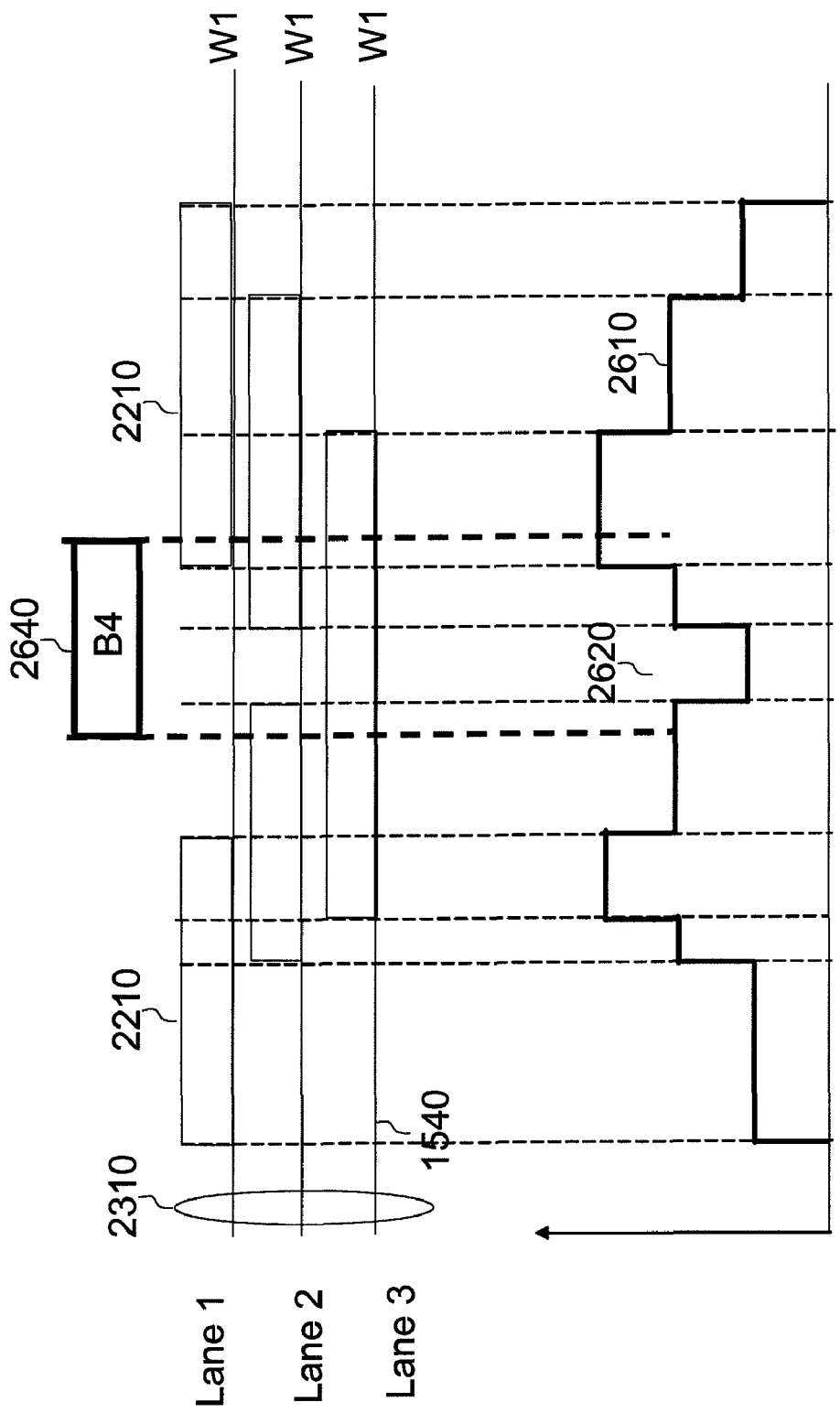

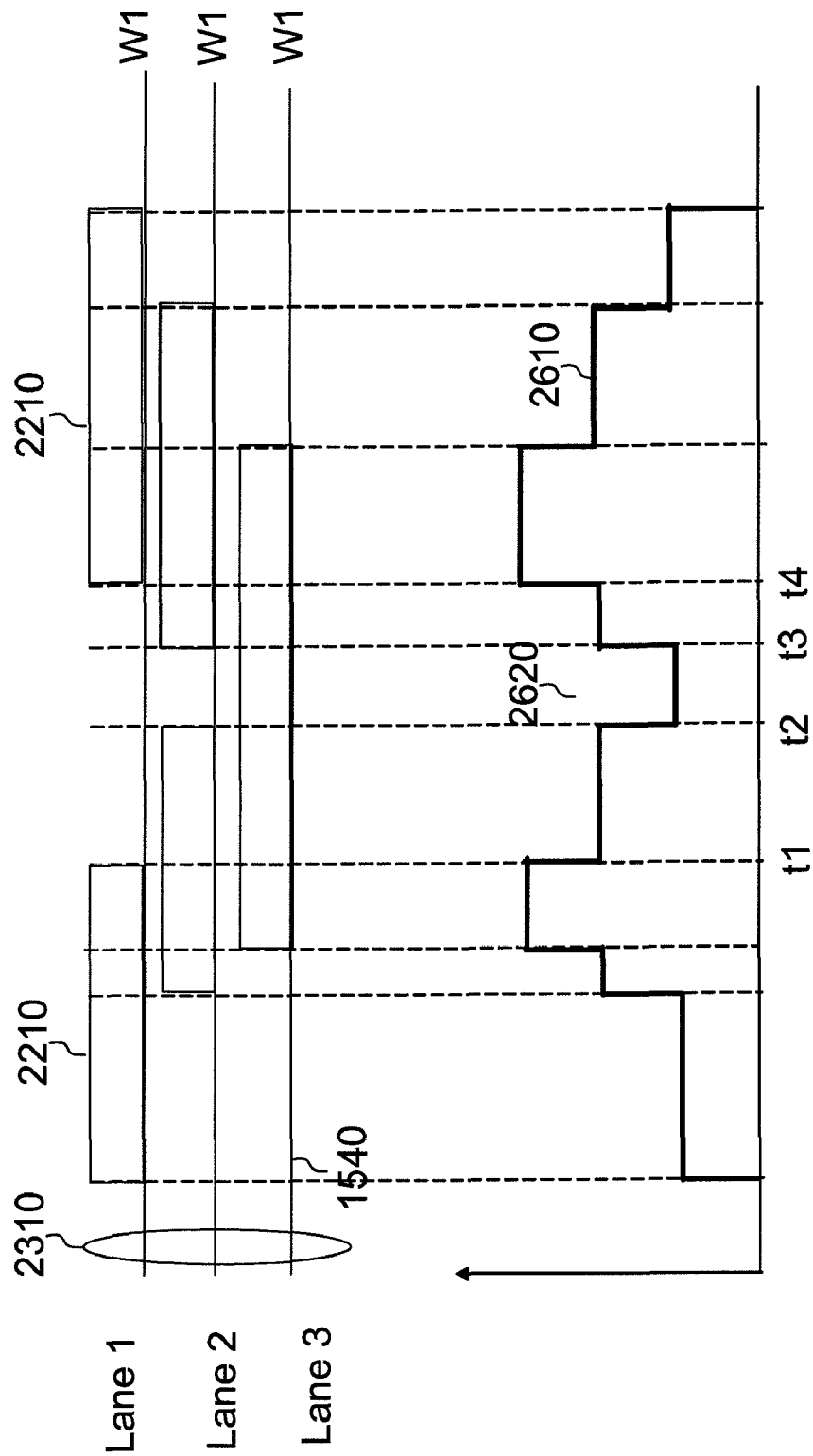

METHODS FOR NON-WAVELENGTH-CONVERTING MULTI-LANE OPTICAL SWITCHING

RELATED APPLICATIONS

This application claims the benefit of U.S. Provisional Patent Application No. 60/986,818 filed Nov. 9, 2007.

FIELD OF THE INVENTION

The present invention relates to optical networks, and, more particularly, to systems used for routing multi-wavelength optical signals.

BACKGROUND OF THE INVENTION

Over the last decade, the amount of information that is conveyed electronically has increased dramatically. As the need for greater communications bandwidth increases, the importance of efficient use of communications infrastructure increases as well. The emergence of dense-wavelength division multiplexing (DWDM) technology has improved the bandwidth problem by increasing the capacity of an optical fiber. In wavelength division multiplexing (WDM), channels are arranged by a predetermined wavelength interval, and signals are loaded on each channel. Also, a number of channels are optically multiplexed, and the signals are transmitted through an optical fiber. A receiver optically demultiplexes the channels according to their wavelengths and utilizes each channel separately. DWDM is now well established as a principal technology to enable large transport capacities in long-haul communications.

However, the increased capacity creates a serious mismatch with current electronic switching technologies that are designed to process individual channels within a DWDM link. In electronic switching, the optical fiber additionally requires a photoelectric converter for converting an optical signal into an electrical signal and an electro-optic converter for converting an electrical signal into an optical signal, which results in an increased cost. While electronic switching routers, such as internet protocol (IP) routers, can be used to switch data using the individual channels within a fiber, this approach implies that tens or hundreds of switch interfaces must be used to terminate a single DWDM fiber with a large number of channels. This could lead to a significant loss of statistical multiplexing efficiency when the parallel channels are used simply as a collection of independent links, rather than as a shared resource.

In order to solve such problems, there were several proposed solutions in the related art optical switching technologies, which do not convert the transferred optical signal into the electrical signal but processes the optical signal directly. Optical switching technologies based on wavelength routing (circuit-switching) of a limited pool of wavelengths don't make efficient use of the transmission medium when data traffic dominates the public network. This is the case today where the increasing demand for bandwidth is largely due to a spectacular growth in IP data traffic. All-optical packet switching would be an optimum transfer mode to handle the flood of optical IP packets to and from the Internet core in the most efficient way. However, a number of packet-switching operations (e.g. ultra fast pulsing, bit and packet synchronization, ultra-high-speed switching, buffering and header processing) cannot be performed optically, on a packet-by-packet basis today.

An optical burst switching (OBS) network makes use of both optical and electronic technologies. The electronics provides control of system resources by assigning individual user data bursts to channels of a DWDM fiber, while optical technology is used to switch the user data channels entirely in the optical domain. In the OBS, the length of a data packet can be variable and packet routing can be performed without an optical buffer by setting a path in advance using a control packet.

In the OBS network, generally, Internet protocol (IP) packets or data stream of any form inputted in an optical domain are gathered as a data burst in an edge node, and such data bursts are routed by way of a core node depending on their destinations or Quality of Services (QoS) and then sent to the destination nodes. Further, a burst header packet and the data burst are respectively transmitted on different channels and at an offset time. That is, the burst header packet is transmitted earlier than the data burst by the offset time and it reserves a optical path through which the data burst is transferred, so that the data burst can be transmitted through the optical network at a high speed without being buffered.

However, in the OBS network, data burst can be lost due to a contention in the optical switch. One optical burst switching scheme uses wavelength conversion to reduce the contention on output channels. Unfortunately, all optical wavelength converters may remain expensive now and in foreseeable future. The need for wavelength converter makes the cost of deploying OBS networks high.

In order to remove the wavelength conversion constraints in OBS networks, Time Sliced Optical Burst Switching (TSOBS) replaces switching in the wavelength domain with switching in the time domain. However, although the TSOBS router eliminates the wavelength converters, it uses more optical crossbars than a traditional OBS router, and also makes extensive use of fiber delay lines (FDLs) which are not required for traditional OBS routers. In addition, synchronizing time slots also presents a challenge.

Therefore, it is desirable to provide optical switching methods and systems providing multi-wavelength switching without wavelength conversion. The methods and systems discussed herein provide a lower cost option for fiber optic switching.

SUMMARY OF THE INVENTION

In view of the foregoing and other considerations, the present invention relates to multi-wavelength switching.

In accordance with the present invention, there is provided methods to reduce the need for wavelength conversion in optical burst switching networks. The present invention provides statistical multiplexing performance. The present invention provides methods of constructing an optical router using small space switching matrix. The present invention provides methods for incremental deployment of wavelengths. The present invention provides methods for fast and efficient wavelength scheduling. The present invention provides methods for controlling the throughput. The present invention provides methods for controlling the latency.

Accordingly, methods for multi-wavelength switching are provided. The method comprises receiving a plurality of signals through at least one input port, and separating the plurality of said signals into at least one wavelength signal set based on wavelengths, wherein a first wavelength signal set of said at least one wavelength signal sets corresponds to a first wavelength. The method further comprises providing a plurality of output lanes to at least one output port, and determining if two signals from said first wavelength signal set traveling on said first wavelength are scheduled output from an output port during an overlapping time period through said plurality of output lanes. The method further comprises determining if one of said plurality of output lanes is available during said overlapping time period when said two signals are schedule for said output port during the overlapping time period, wherein a first signal of said two signals is routed for output on an available lane if one of said plurality of output lanes of said output port is available.

Yet another embodiment provides methods for multi-wavelength switching. The method comprises receiving a control signal corresponding to a data signal scheduled to arrive on a first wavelength through at least one input port; providing a plurality of output lanes to at least one output port, supporting at least one output wavelength on said plurality of output lanes, and maintaining status information on said plurality of output lanes for said at least one output wavelength. The method further comprises determining a destination output port for said data signal based on routing information in said control signal, and determining if one of said plurality of output lanes of said destination output port is available for an overlapping time with said data signal. The method further comprises selecting an available lane if one of said plurality of output lanes of said destination output port is available for said overlapping time, and routing said data signal to said selected output lane of said destination output port.

Yet another embodiment provides systems for multi-wavelength switching. The system comprises at least one input port, wherein a plurality of input signals are provided through said input port, at least one output port comprising of a plurality of output lanes, and at least one demultiplexer (DMUX), wherein said at least one DMUX separates said plurality of input signals into at least one wavelength signal set based on wavelength, wherein a first wavelength signal set of said at least one wavelength signal set corresponds to a first wavelength. The system further comprises a switch fabric routing said plurality of input signals, and a switch controller coupled to said switch fabric, said switch controller determines if contention is present for said first wavelength signal set, contention arising when two signals from said first wavelength set traveling on said first wavelength are scheduled for output during an overlapping time period through a first output port of said at least one output port, said switch controller determining if one of said plurality of output lanes of said first output port is available during said overlapping time period if contention is present for said first wavelength signal set, and said first signal of said two signals is routed for output on an available lane if one of said plurality of output lanes of said first output port is available. The system further comprises at least one multiplexer (MUX), wherein said at least one MUX combines signals scheduled for output on said plurality of output lanes into a modified signal set, wherein said modified signal sets is output through said first output port.

The foregoing has outlined some of the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A complete understanding of the present invention may be obtained by reference to the accompanying drawings, when considered in conjunction with the subsequent, detailed description, in which:

FIG. 5 (b) shows an example of routing a set of data bursts through an optical core router with wavelength conversion capability;
FIG. 8 (b) shows the Optical Time Slot Interchanger (OTSI) module in a TSOBS router;
FIG. 11 (b) shows multi-lane optical burst switching core network connected with traditional electronic ingress edge routers;
FIG. 11 (c) shows multi-lane optical burst switching core network connected with traditional electronic egress edge routers;
FIG. 11 (d) shows multi-lane optical burst switching core network connected with traditional optical core routers;
FIG. 14 (b) shows the integrated router is connected in a ring configuration.
FIG. 18 (b) shows a centralized multi-lane switch controller;
FIG. 25 (b) shows a multi-lane data burst is scheduled successfully;
FIG. 25 (c) shows another example of scheduling a multi-lane data burst;
FIG. 25 (d) shows that a multi-lane data burst is discarded.

FIG. 26 (b) shows an example of scheduling a multi-lane data burst using the lane usage map;

FIG. 26 (c) shows that an updated lane usage map after a multi-lane data burst is accepted;

FIG. 26 (d) shows another example of scheduling a multi-lane data burst using the lane usage map;

FIG. 26 (e) shows the multi-lane data burst is discarded;

FIG. 27 (b) shows the mini dip table that records a single dip in the lane usage map;

FIG. 27 (c) shows that the entire lane usage map can be recorded using a series of mini dip tables;

FIG. 28 (b) shows only a single mini dip table needs to be accessed to schedule a multi-lane data burst.

For purposes of clarity and brevity, like elements and components will bear the same designations and numbering throughout the Figures.

DETAILED DESCRIPTION

Figure 1:
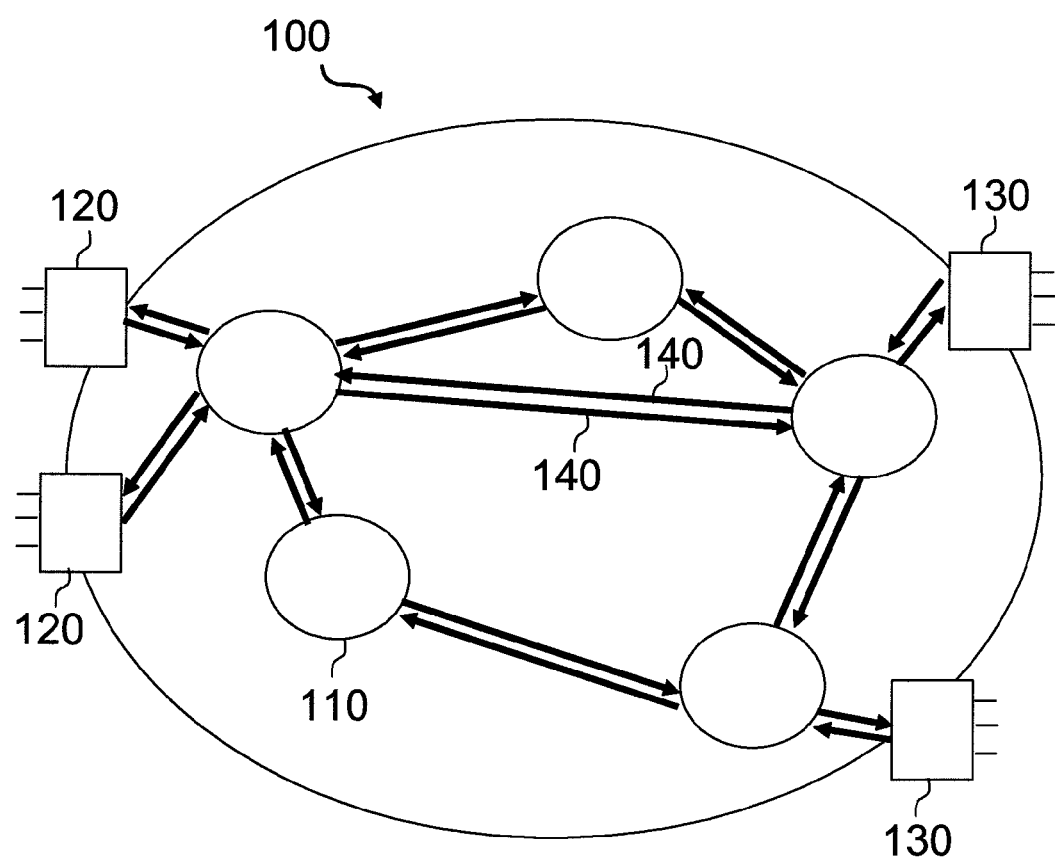
FIG. 1 illustrates an optical burst switching network.

Refer now to the drawings wherein depicted elements are not necessarily shown to scale and wherein like or similar elements are designated by the same reference numeral through the several views.

Optical Burst Switching (OBS) networks rely on wavelength conversion to provide statistical multiplexing performance. The cost of wavelength converters will remain expensive in foreseeable future, making the cost to deploy OBS network prohibitively high. The methods described in this disclosure provide statistical multiplexing performance without using the expensive wavelength converters. By eliminating the need for wavelength converters, the present invention greatly reduces the cost for OBS deployment.

FIG. 1 shows an example of an optical burst switching network 100. The optical burst switching network 100 includes multiple electronic ingress edge routers 120, multiple optical core routers 110, and multiple electronic egress edge routers 130 connected by wavelength division multiplexing (WDM) links 140. The term WDM as used herein includes both dense wavelength division multiplexing (DWDM) and coarse wavelength division multiplexing. The electronic ingress edge router 120 and the electronic egress edge router 130 perform burst assembly and disassembly functions respectively, and serve as legacy interfaces between the optical core routers 110 and conventional electronic routers.

Figure 2:
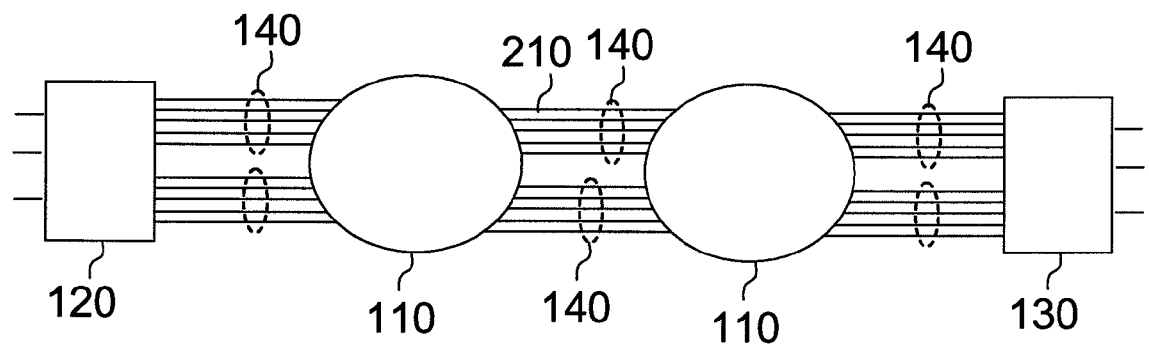
FIG. 2 shows an example of transmitting a data burst through an optical burst switching network.
Figure 2:
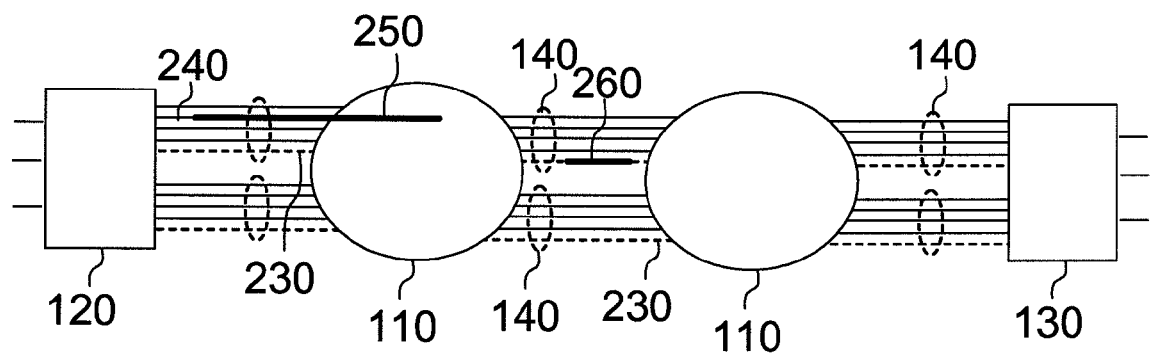

FIG. 2 (a) shows an example of routers connected by WDM links. A WDM link 140 includes multiple wavelengths 210, and represents the total unidirectional transmission capacity (in bits per second) between two adjacent routers. Two adjacent routers are typically connected with a WDM link 140 in each direction.

In optical burst switching network 100, wavelengths 210 in a WDM link 140 is divided into a set of control signals, such as control wavelength 230, and a set of data signals, such as data wavelengths 240, as illustrated in FIG. 2 (b). At least one of the wavelengths 210 in a WDM link 140 should be assigned as a control wavelength 230. A data burst 250 is the basic data transfer block in the optical burst switching network 100. A data burst 250 can be a single data chunk, or a collection of data packets which are destined for the same destination electronic egress edge router 130. Other attributes such as quality of service (QoS) requirements may also be considered when forming data bursts 250.

In optical burst switching networks 100, before a data burst 250 is launched on one of the data wavelengths 240, a burst header packet 260 is launched on the control wavelength 230. The burst header packet 260 carries routing information, as well as information specific to the optical burst switching network 100. Examples of information contained in burst header packet 260 may include: (1) offset time, specifying the time difference between the transmission of the first bit of a burst header packet 260 and the transmission of the first bit of its associated data burst 250; (2) burst length or burst duration, specifying the duration of the data burst 250; (3) data wavelength identifier, specifying the data wavelength 240 on which the data burst 250 is transmitted; and (4) QoS, specifying the quality of service to be received by the data burst 250.

An important feature of the optical burst switching network 100 is that the data burst 250 and the burst header packet 260 are transmitted and switched separately. The operation of the optical burst switching network 100 is described as follows. When data chunks or data packets arrive at the electronic ingress edge router 120, they are assembled into data burst 250 based on their destination electronic egress edge router 130 addresses and other attributes such as QoS. Once the data burst 250 is formed, a burst header packet 260 is generated and sent on the control wavelength 230 at an offset time ahead of the data burst 250. The burst header packet 260 is processed electronically at each optical core router 110. Based on the information carried in the burst header packet 260, the optical core router 110 dynamically sets up an optical path shortly before the arrival of the data burst 250. The data burst 250 is not electronically processed in the optical core router 110, and is passed to the output specifying the data wavelength 240 as a pure optical signal. This process continues as the data burst 250 traverse the optical burst switching network 100 till it reaches the electronic egress edge router 130, where the data burst 250 is disassembled back into data chunks or data packets.

Figure 3:
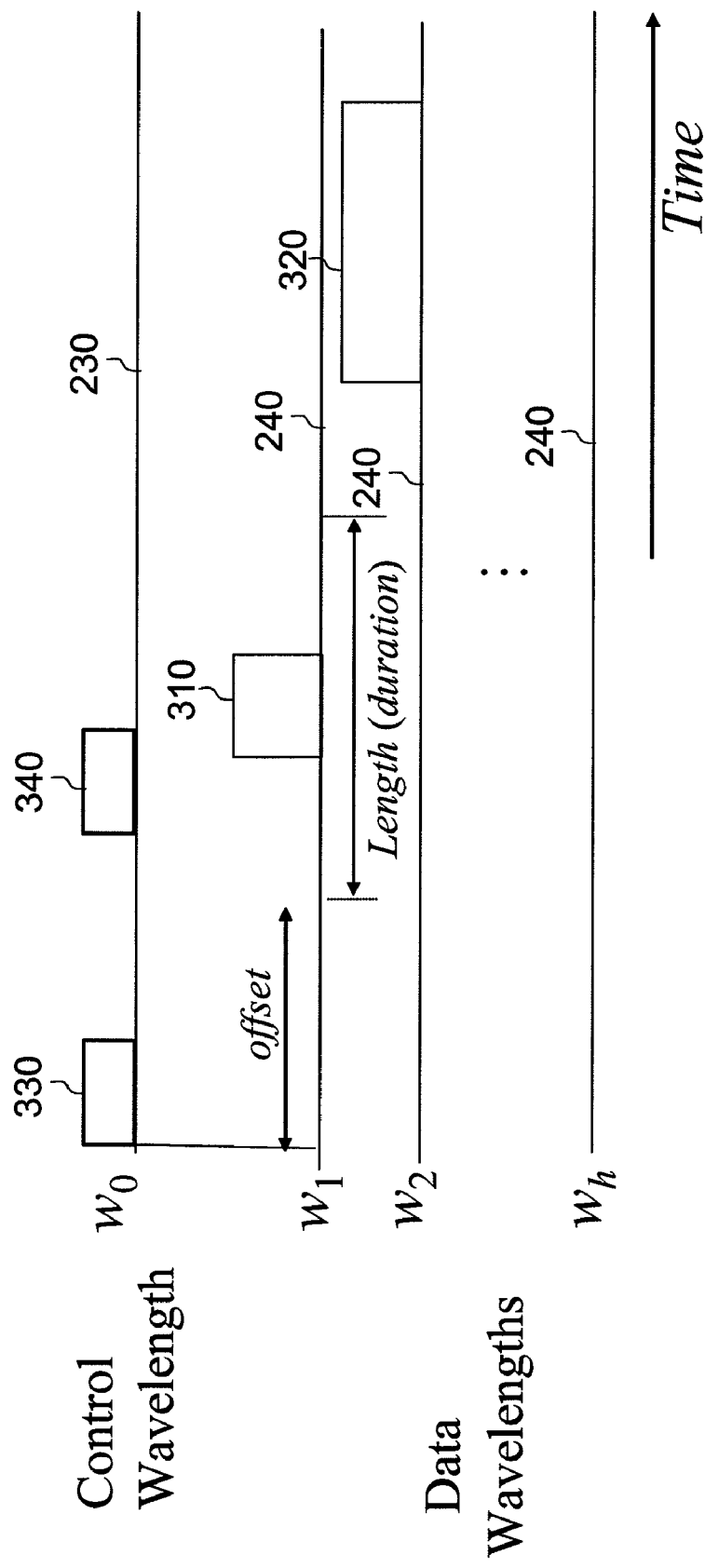
FIG. 3 shows the timing relationships between the burst header packet and the data burst.

FIG. 3 shows the relationships between the burst header packets 260 and their associated data bursts 250. In this example, wavelength 210 $w_0$ is assigned as the control wavelength 230 to send burst header packets 260, and wavelength 210 $w_1$ to $w_h$ are assigned as data wavelengths 240. FIG. 3 shows that data burst 1 310 and data burst 2 320 are traveling on data wavelength 240 $w_1$ and $w_2$, respectively, while burst header 1 330 and burst header 2 340 are traveling on control wavelength 230 $w_0$. FIG. 3 also illustrates the offset time between burst header packet 1 330 and data burst 1 310, and the length (duration) of data burst 1 310.

Optical burst switching processes burst header packets 260 electronically, while providing ingress-egress optical paths in the optical burst switching network 100. Each burst header packet 260 carries necessary routing and optical burst switching network 100 specific information about the associated data burst 250 such that the data burst 250 can pass through the optical core router 110 as an optical signal.

Figure 4:
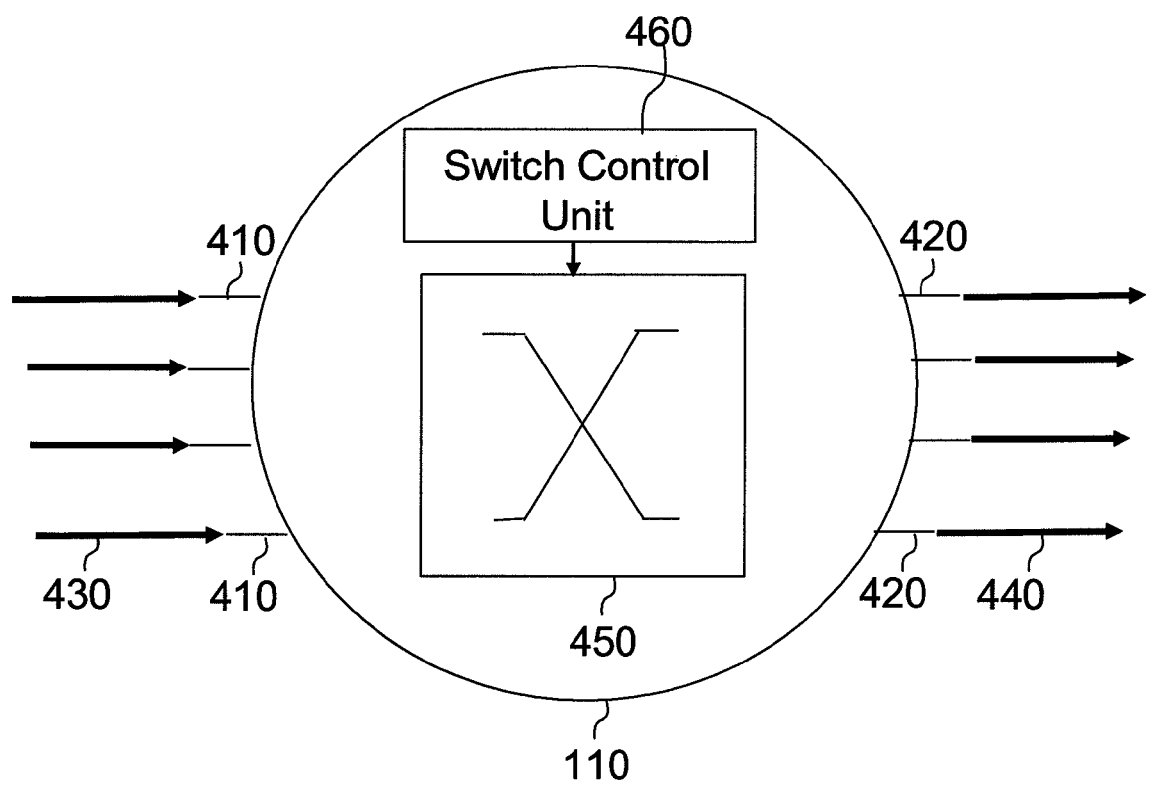
FIG. 4 shows an optical core router.

FIG. 4 shows an optical core router 110 connected to WDM links 140. Incoming WDM links 430 and outgoing WDM links 440 are connected to the input ports 410 and the output ports 420 of the optical core router 110. The data wavelengths 240 in the WDM links 140 are connected to an optical switching matrix 450 in the optical core router 110. The control wavelengths 230 are connected to a switch control unit 460. The burst header packets 260 sent on the control wavelength 230 are converted to electronic signals and processed electronically inside the switch control unit 460. Based on the information carried in the burst header packets 260 and outgoing WDM link 140 status, the switch control unit 460 sets up and tears down optical paths at appropriate times to allow data bursts traveling on data wavelengths 240 to pass through the optical core router 110 without converting to electronic signals.

In optical burst switching network 100, data bursts 250 are generally launched without pre-established lightpaths. Lightpaths are set up on-the-fly as data burst 250 approaches the optical core router 110. Contention occurs when two bursts traveling on the same wavelength compete for the same output port. When contention cannot be resolved, one of the contenting bursts has to be dropped, despite the fact that it has consumed upstream network resources. Therefore, burst loss probability is a key performance measure in optical burst switching network 100. Contention can be greatly reduced by converting one of the incoming bursts to a different wavelength. Therefore, wavelength conversion is generally required to achieve acceptable performance in optical burst switching networks 100.

Figure 5:
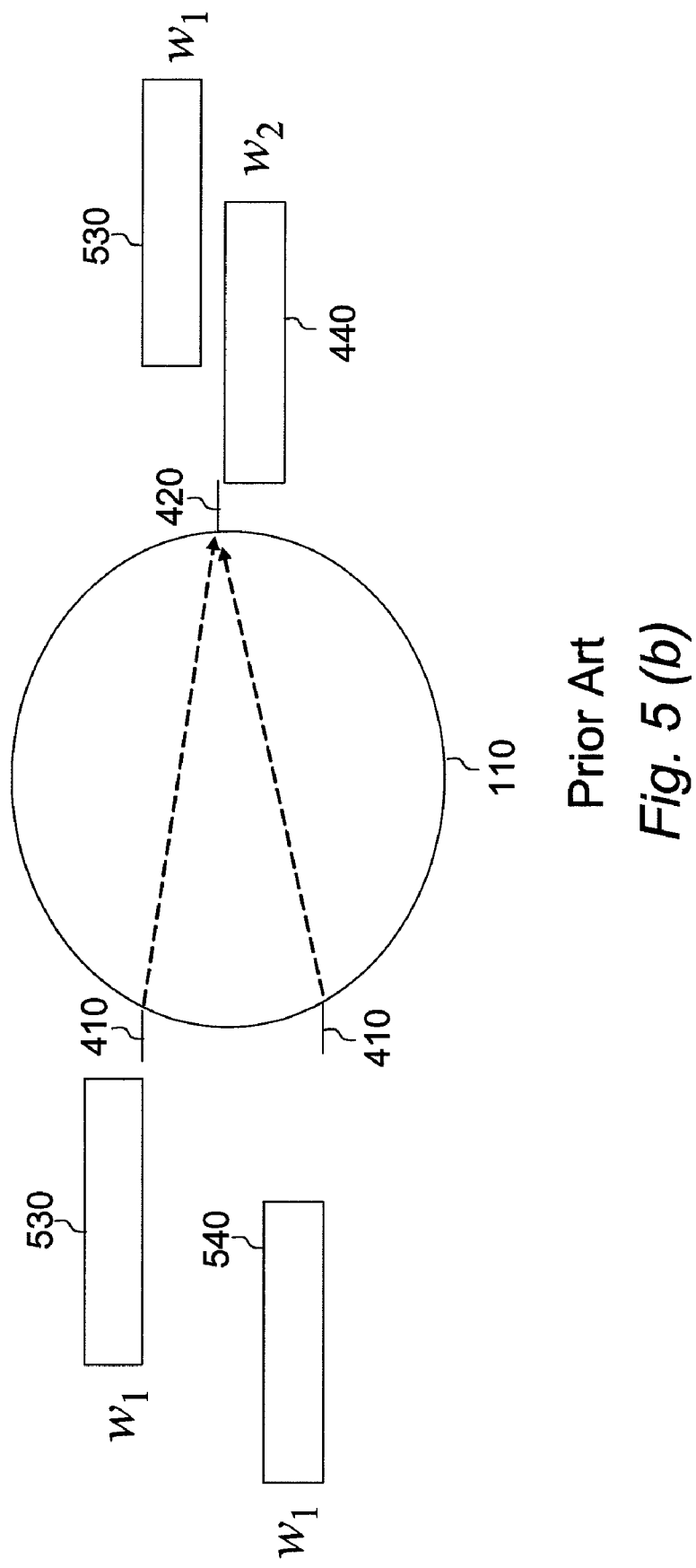
FIG. 5 (a) shows an example of routing a set of data bursts through an optical core router without wavelength conversion capability.

In the example illustrated in FIG. 5 (a), data burst 3 530 and data burst 4 540 destined for the same output port are coming on data wavelength 240 $w_1$ from two different input ports. In FIG. 5 (a), the optical core router 110 does not have wavelength conversion capability. Since data burst 3 530 and data burst 4 540 overlap in time and are on the same data wavelength 240, only data burst 3 is routed successfully, and data burst 4 has to be discarded.

In FIG. 5 (b), the optical core router 110 has wavelength conversion capability. In this case, data burst 4 540 is converted to data wavelength 240 $w_2$. Both data burst 3 530 and data burst 4 540 are routed successfully.

As we can see, wavelength conversion reduces the burst loss probability, which is the key performance measure of optical burst switching network. In order to reduce the burst loss probability, traditional optical burst switching networks 100 rely on wavelength conversion for contention resolution. When two bursts competing for the same output port 420 at an optical core router 110, one of the bursts 250 needs be converted to a different wavelength so that both bursts can be carried on the outgoing WDM link 140 successfully. Because dense wavelength division multiplexing (DWDM) technology allows each fiber to carry tens or hundreds of wavelengths, a burst can be statistically multiplexed onto any of the data wavelengths 240 on the outgoing WDM link 140, achieving low burst loss probability.

However, as the technology stands now, the price for wavelength converters remains high. This becomes one of the major obstacles that prevent optical burst switching network 100 from widespread deployment.

DWDM technology allows for expansion in transmission link capacity. For example, optical link capacity can be easily increased from 10 Gb/s to 1 Terabits/s by lighting up 100 wavelengths over the same fiber, assuming each wavelength channel is at 10 Gb/s. With the current technology, it is feasible to support more than 256 wavelength channels per fiber. Unfortunately, this technology trend has several negative implications on the optical router designs.

1) A large number of wavelengths may require large switching matrix. If an optical core router 110 has d input ports 410 and d output ports 420, each of which is connected to a WDM link 140 with M data wavelengths 240, the size of the optical switching matrix 450 is N=d×M. For example, if d=8 and M=256, the size of the optical switching matrix 450 is 2048×2048. This has a serious implication on the implementation of optical core routers 110. For example, it is more difficult to realize large optical switching matrix 450 because of technology constraints such as insertion loss. The largest switching matrix available today is 1024×1024. In addition, large switching matrix is much more expensive than small switching matrix, which can drive the cost of optical core routers 110 even higher.

2) Adding additional wavelengths to an existing system may require replacement of an existing switching matrix in the optical core router 110. As we can see from the calculation above, the size of the optical switching matrix 450 is directly related to the number of data wavelengths 240 per input port 410. For example, a 32×32 optical switching matrix 450 is needed if d=8 and M=4. If we want to use 16 data wavelengths 230 instead, we need to replace the existing optical switching matrix 450 with a 128×128 optical switching matrix 450. Since a large optical switching matrix 450 is much more expensive, there is little incentive for network service providers to provision a large optical switching matrix 450 in the optical core router 110 for future wavelength expansion. This basically limits the expandability of optical core routers 110.

An optical switching matrix 450 in the optical core router 110 is able to switch data burst 250 from an incoming WDM link 430 to an outgoing WDM link 440. The cost of constructing an optical core router 110 is mostly determined by the cost for the optical switching matrix 450. Several optical switching architectures have been proposed for OBS networks 100 in order to reduce the cost of the optical switching matrix 450.

Figure 6:
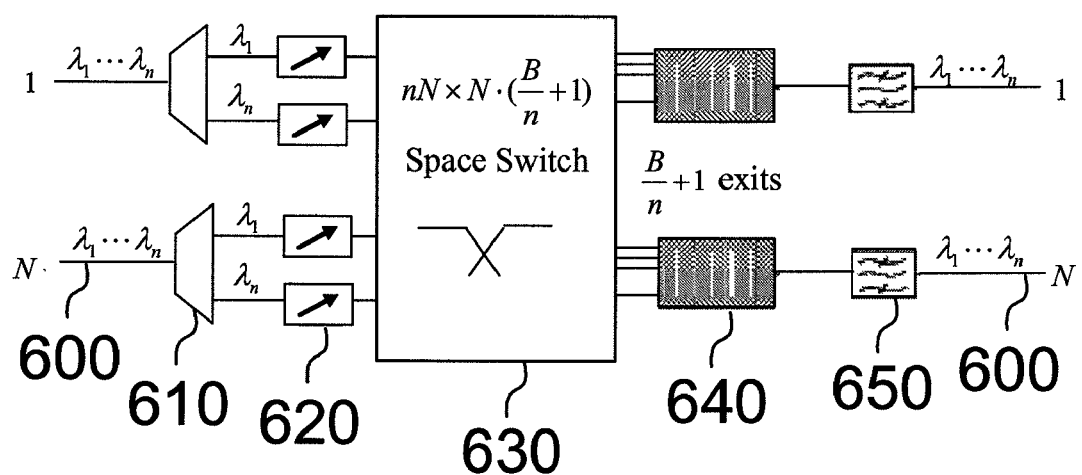
FIG. 6 shows a general optical switching matrix.

FIG. 6 shows a general structure of optical switching matrix 450. The optical demultiplexer (DMUX) 610 separates wavelengths coming from the optical fiber 600. Input wavelengths are converted to free output wavelengths using tunable wavelength converters (TWC) 620. A nonblocking space switch 630 connects the input wavelengths to the desired outputs as well as the appropriate output buffers that are realized using fiber delay lines (FDLs) 640. The multiwavelength bandpass filter 650 combines the wavelengths onto the outgoing optical fiber 600.

Figure 7:
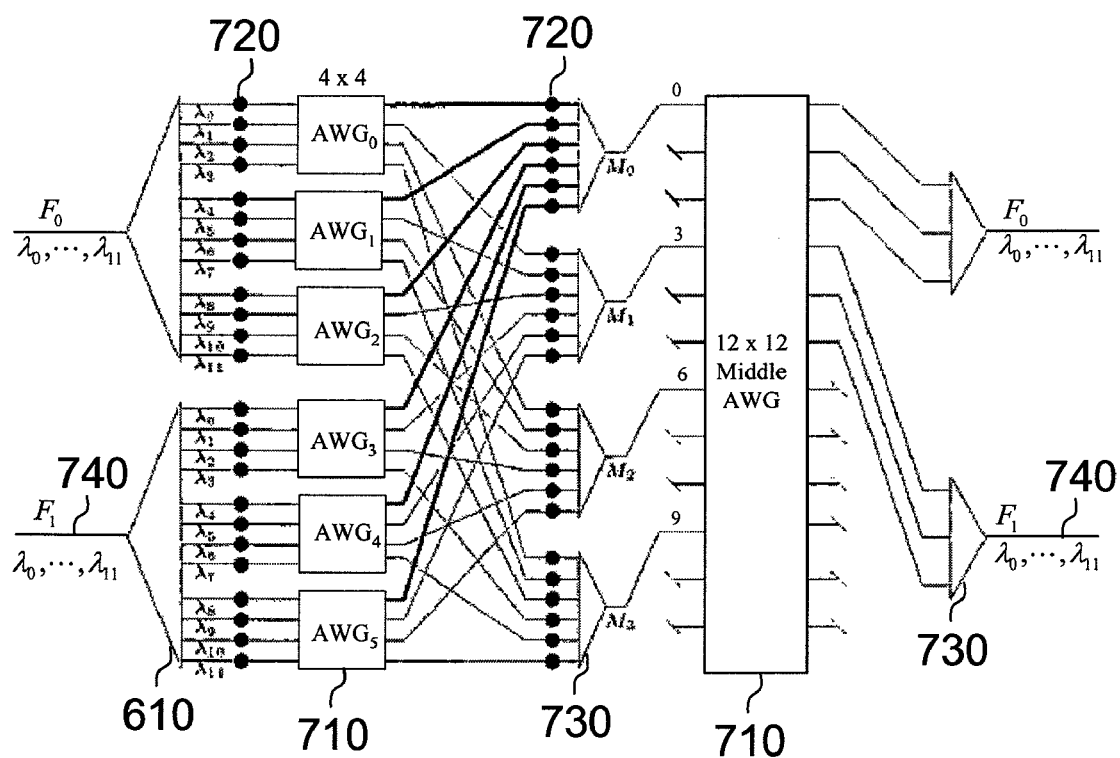
FIG. 7 shows an optical switching matrix using limited range wavelength converter.

A rearrangably nonblocking switch design using Arrayed Waveguide Grating (AWG) 710 router and limited range wavelength converters (LWC) 720 is shown in FIG. 7. The dark dots in the figure represent LWCs 720. The construction uses twice as many wavelength converters as the structure shown in FIG. 6. However, in this design, the less expensive limited range wavelength converters 720 instead of full-range tunable wavelength converters 620 can be used.

The above mentioned architectures rely on wavelength converters. Unfortunately, wavelength converter is the largest single cost component in an optical core router 110.

In order to remove the need for costly wavelength conversion, Time Sliced Optical Burst Switching (TSOBS) was proposed as a variant of optical burst switching by replacing switching in the wavelength domain with switching in the time domain. In TSOBS, data wavelengths 240 consist of a repeating frame structure, which is further divided into time slots of fixed length. A data burst 250 can occupy one time slot in each of the successive frames. By allowing time slot shifting, TSOBS provides statistical multiplexing performance without using wavelength conversions.

Figure 8:
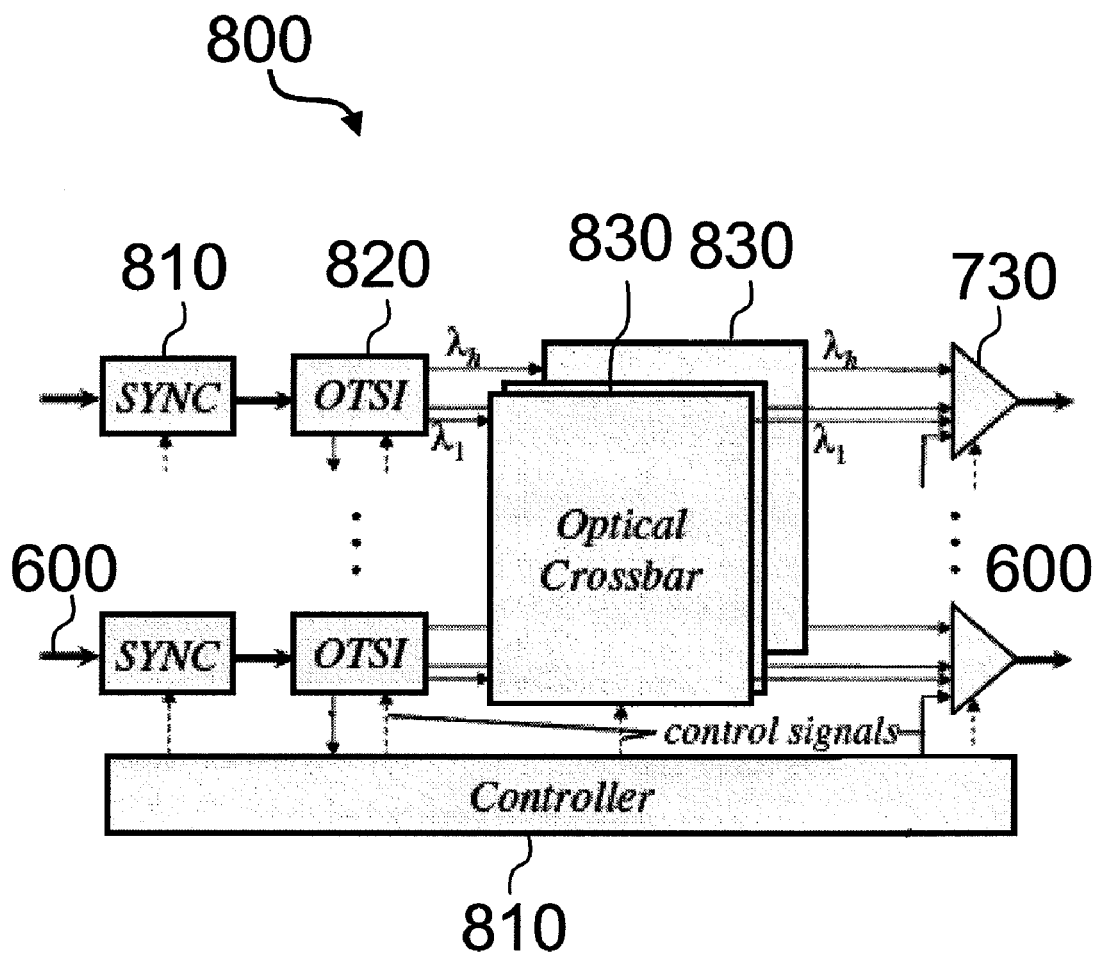
FIG. 8 (a) shows the architecture of a Time Sliced Optical Burst Switching (TSOBS) router.
Figure 8:
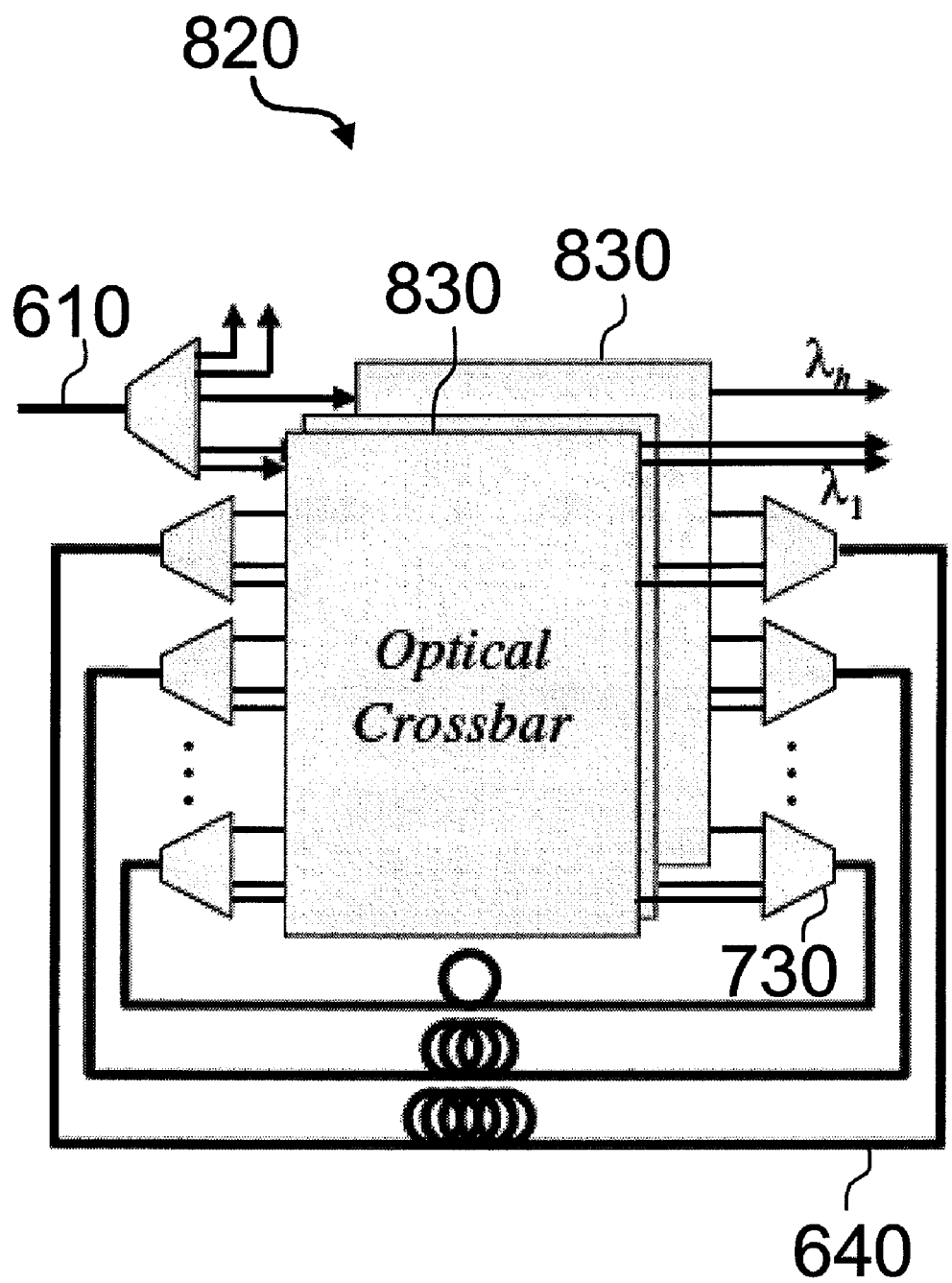

The overall TSOBS router 800 architecture is shown in FIG. 8 (a). The synchronizer (SYNC) 810 at each input synchronizes the incoming frame boundaries to local timing reference by using variable delay lines. The Optical Time Slot Interchanger (OTSI) 820 provides the required time domain switching for all data wavelengths 240. The OTSI 820 also separates the data wavelengths 240 and forwards them to corresponding optical crossbars 830. The optical crossbars 830 provide space switching to the individual data wavelengths 240, respectively. The outputs from the optical crossbars 830 are fed into a set of passive optical multiplexers 730, which combines the wavelengths on the output fiber 600. The OTSI 820 is the key building block of the TSOBS router 800. FIG. 8 (b) shows a high level design of the OTSI 820. Each OTSI 820 uses a set of optical demultiplexers 610, optical crossbars 830, Fiber Delay Lines (FDLs) 640 and optical multiplexers 730 for shifting in time slots.

Note that in a TSOBS router 800, optical crossbars 830 are used in both the OTSI 820 and the top level TSOBS router 800 architecture. In addition, in order to provide nonblocking performance, N fiber delay lines 640 are needed for each data wavelength 240, where N is the number of time slots in a frame. Although the TSOBS router 800 eliminates the tunable wavelength converters 620, it uses more optical crossbars 830 than a traditional OBS router, and also makes extensive use of FDLs 640 which are not required for traditional OBS core routers 110. In addition, synchronizing time slots also presents a challenge.

Traditional OBS networks 100 use wavelength conversion to resolve output contentions. Although this approach provides efficient statistical multiplexing performance, the cost for wavelength converters 620 in the optical core routers 110 has become the major cost in deploying OBS networks 100.

In the present disclosure, several embodiments of systems and methods for providing improved multi-wavelength optical switching are discussed herein. The embodiments provide statistical multiplexing performance without the need to use wavelength converters 620. The signaling protocol used by the embodiments is compatible with the one used in traditional OBS networks 100. Therefore, routers in these embodiments can easily interface with traditional OBS optical core routers 110 without additional overhead.

The improved multi-wavelength optical switching reduces the burst loss due to output channel contention by providing statistical multiplexing performance and reduce the cost of constructing an OBS router. The improved switching provides an OBS router architecture using a plurality of optical space switching matrix with small number of optical crosspoints. The improved switching allows incremental deployment of wavelengths, efficient control over the wavelength channels, and fast scheduling of wavelength channels. Further, the improved switching uses wavelengths efficiently, allows control of the transmission latency, and allows control of the transmission throughput.

In the several embodiments discussed herein, the improved multi-lane optical switching may be discussed with reference to a Multi-Lane Optical Burst Switching (ML-OBS) network 900. However, the features of the embodiments discussed herein may be applied to any form multi-lane optical switching. The scope of the specifications and claims are in no way limited to the particular configurations discussed herein, except as specifically recited in the claims.

Figure 9:
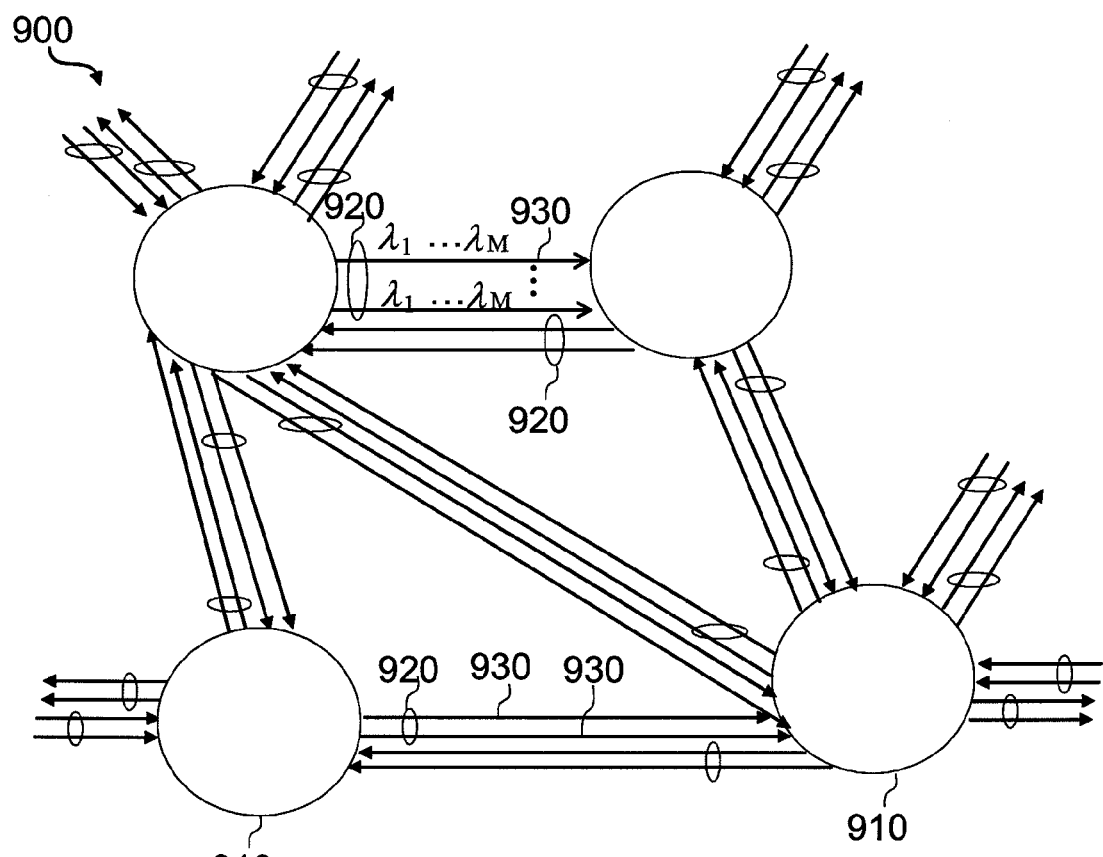
FIG. 9 shows a multi-lane optical burst switching network according to the present invention.

In a multi-lane optical burst switching (ML-OBS) core network 900 shown in FIG. 9, two adjacent multi-lane optical core routers 910 are connected by a multi-lane WDM link 920 in each direction. A multi-lane WDM link 920 comprises of a plurality of WDM lanes 930, each of which is an optical fiber 600 that carries at least one of a plurality of wavelengths 210. The multi-lane WDM link 920 can be constructed using one or multiple multi-fiber optical cables, or a collection of individual optical fibers 600.

Figure 10:
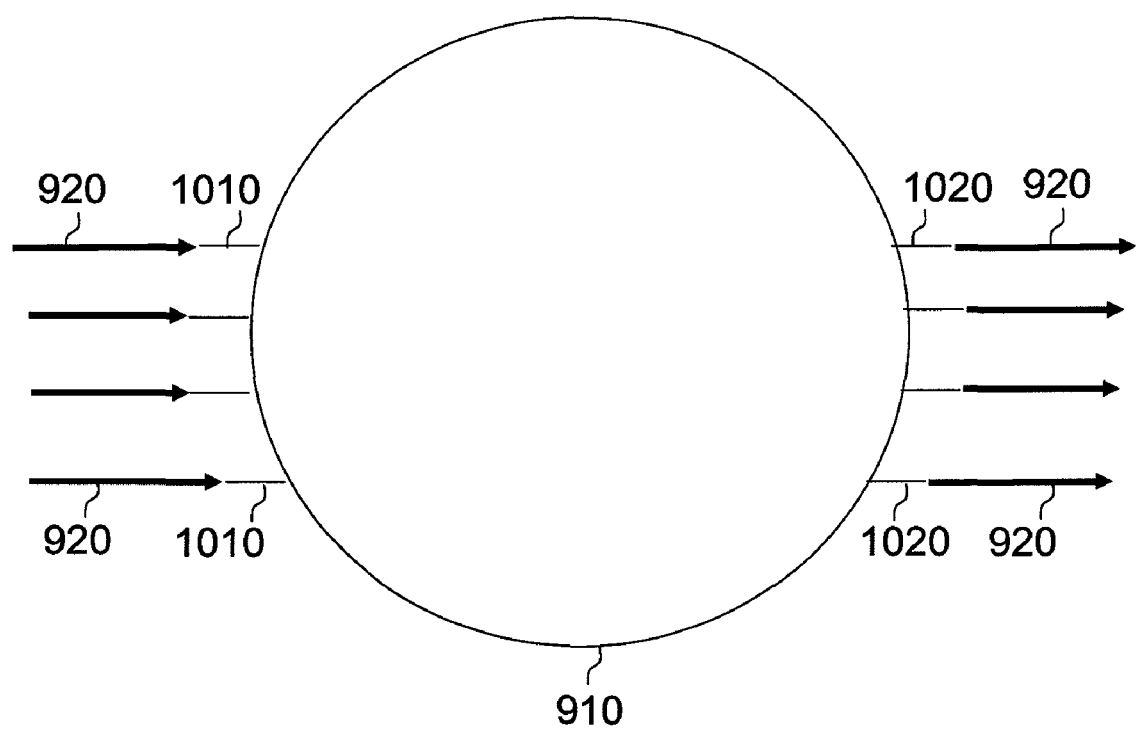
FIG. 10 shows a multi-lane optical core router.

As shown in FIG. 10, an incoming multi-lane WDM link 920 is connected to a multi-lane input port 1010 of a multi-lane optical core router 910. An incoming data wavelength 240 to the multi-lane optical core router 910 can be switched onto any of the WDM lanes 930 in the desired multi-lane output port 1020 of the multi-lane optical core router 910 without the need for wavelength conversion. By engineering the size of the lanes 930 properly, desired statistical multiplexing performance can be achieved without encountering the need for wavelength conversion.

Figure 11:
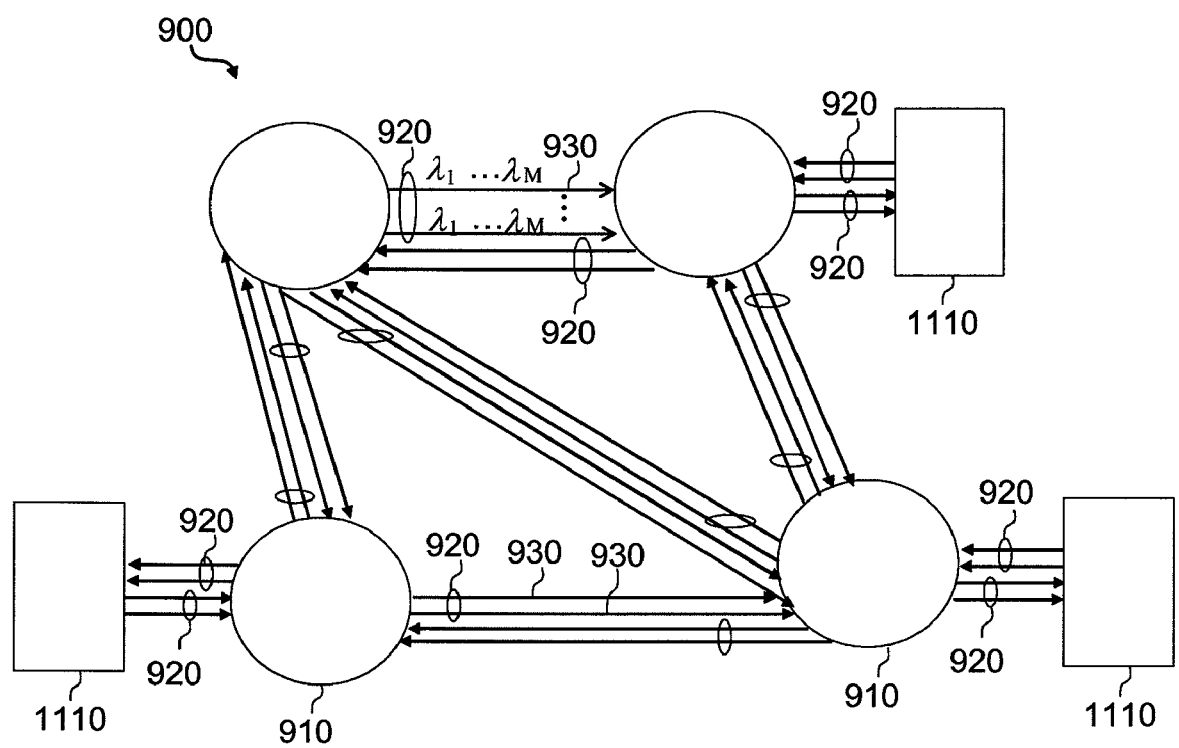
FIG. 11 (a) shows multi-lane optical burst switching core network connected with multi-lane edge routers.
Figure 11:
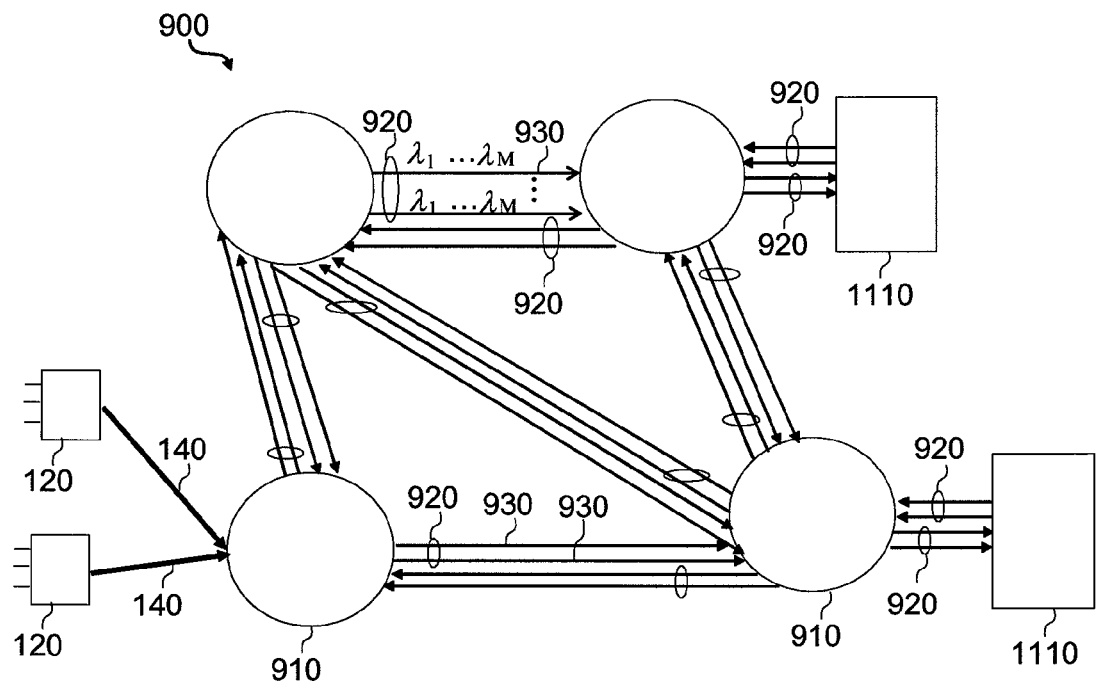
Figure 11:
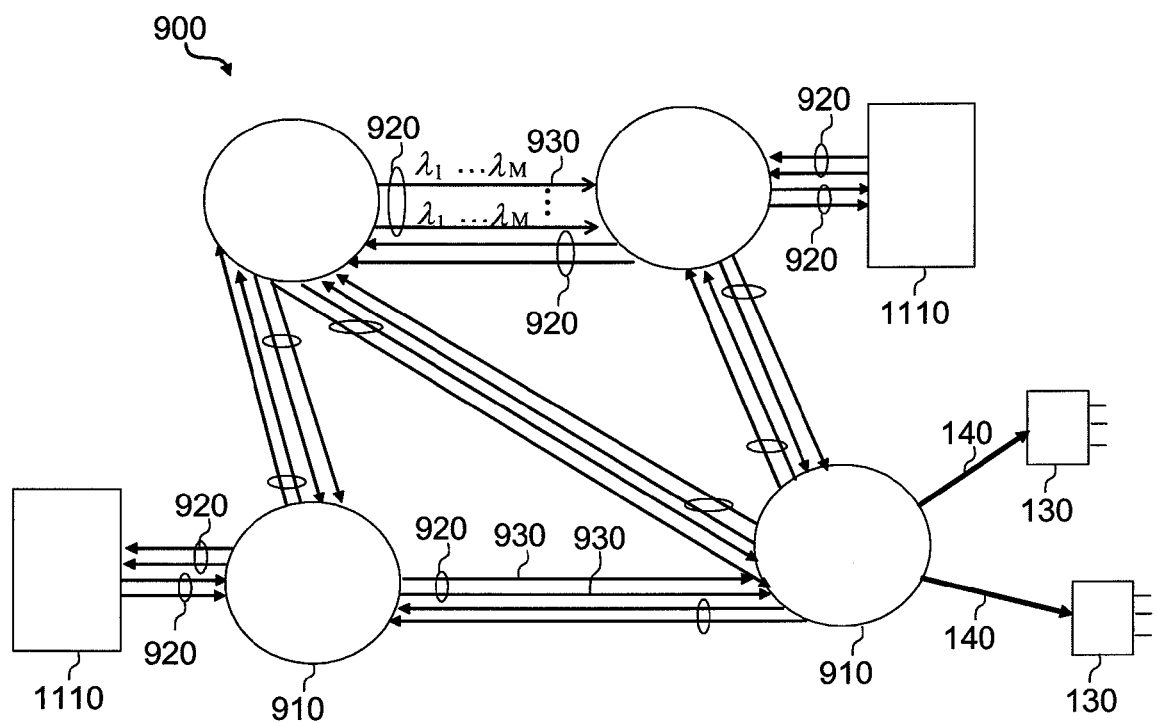
Figure 11:
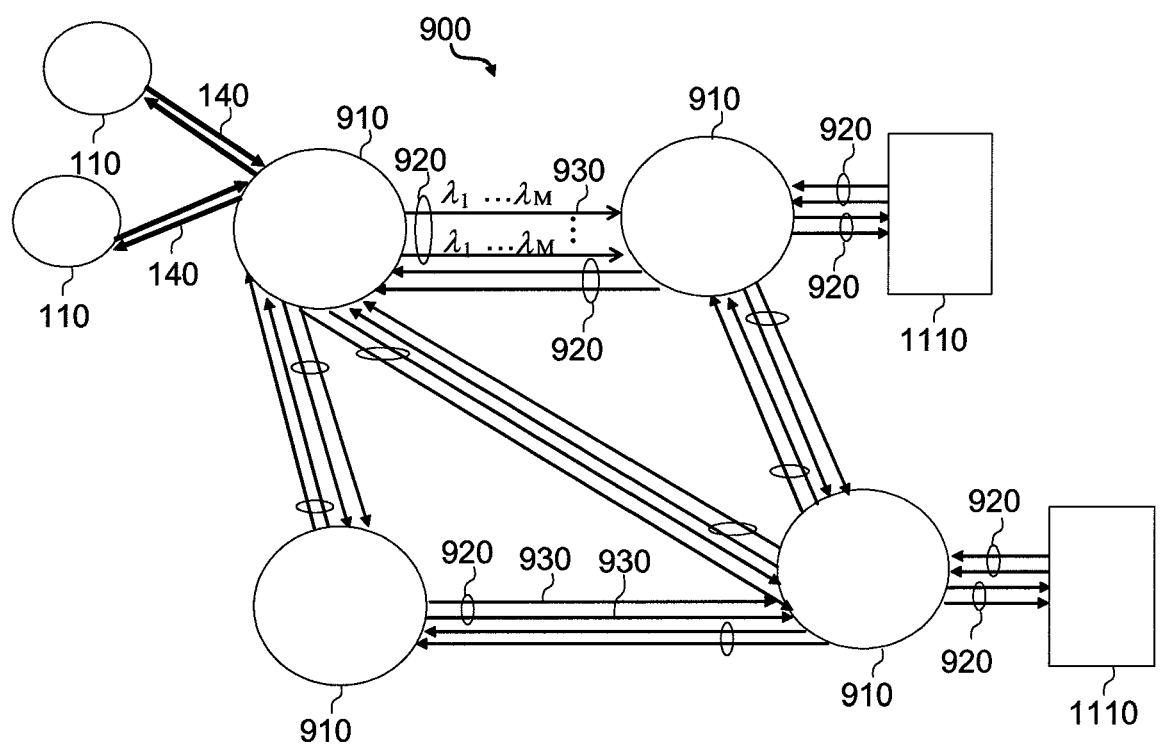

In a preferred embodiment, the multi-lane core network 900 is connected to multi-lane edge routers 1110 using multi-lane WDM links 920 as illustrated in FIG. 11 (a).

In another embodiment shown in FIG. 11 (b), a multi-lane input port 1010 of a multi-lane optical core router 910 is connected to at least one of a plurality of traditional OBS electronic ingress edge routers 120 using WDM links 140.

In another embodiment shown in FIG. 11 (c), a multi-lane output port 1020 of a multi-lane optical core router 910 is connected to at least one of a plurality of traditional OBS electronic egress edge routers 130 using WDM links 140.

In another embodiment shown in FIG. 11 (d), a multi-lane optical core router 910 is connected to at least one of a plurality of traditional OBS optical core routers 110 using WDM links 140.

Figure 12:
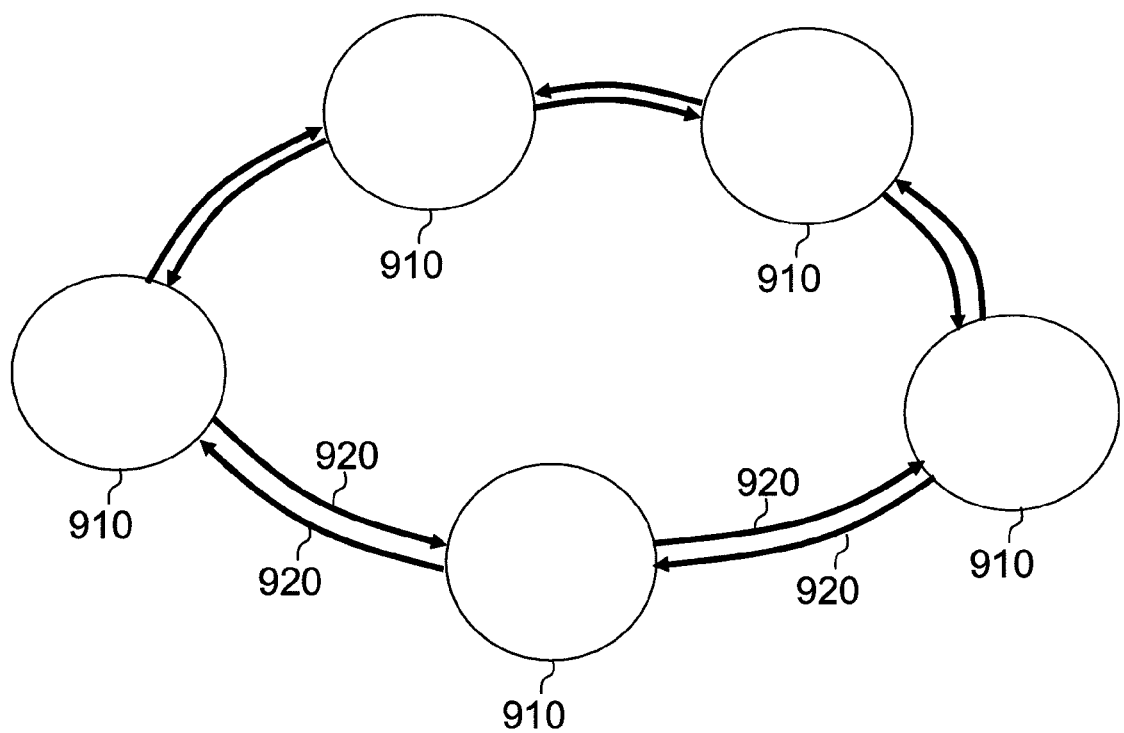
FIG. 12 shows multi-lane optical core router connected in a ring configuration.

In another embodiment shown in FIG. 12, multi-lane optical core routers 910 are connected in a ring structure using multi-lane WDM links 920.

Figure 13:
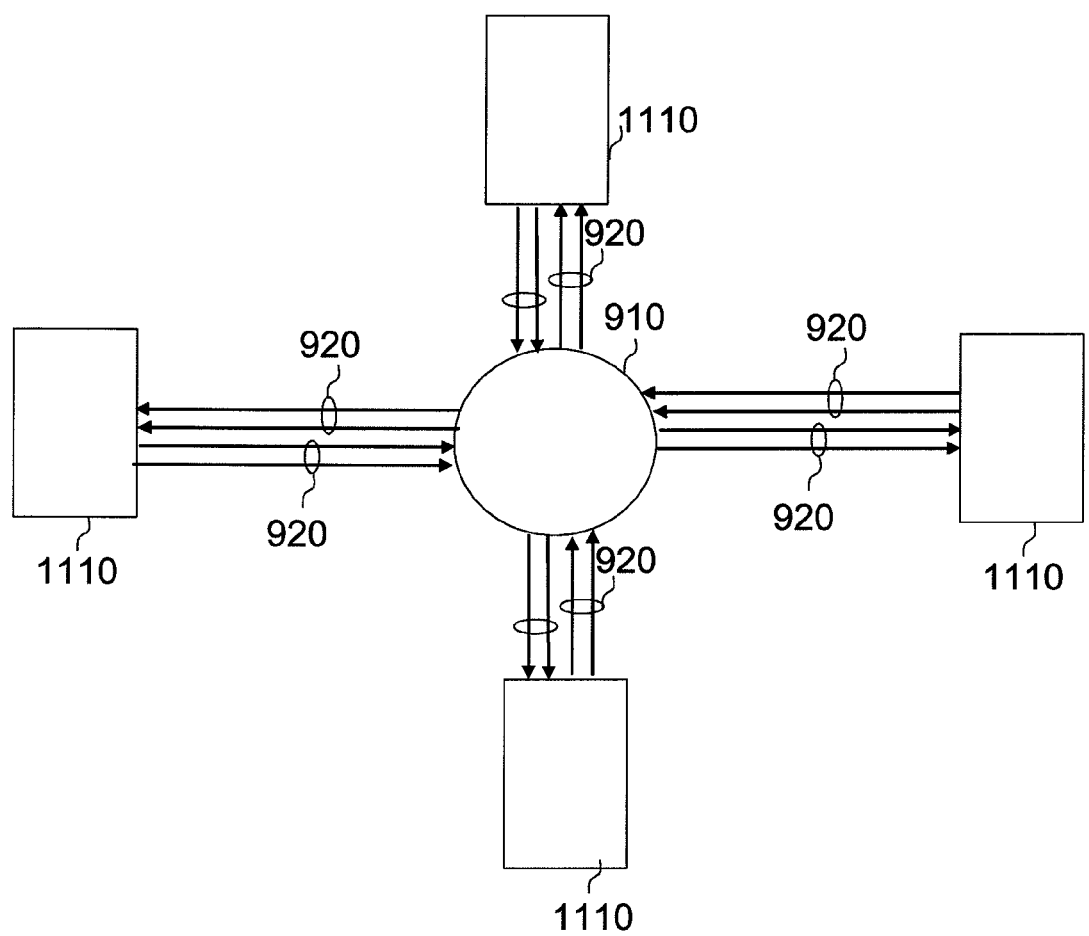
FIG. 13 shows multi-lane optical core router connected in a star configuration.

In another embodiment shown in FIG. 13, the multi-lane optical core routers 910 are connected to multi-lane edge routers 1110 in a star structure.

Figure 14:
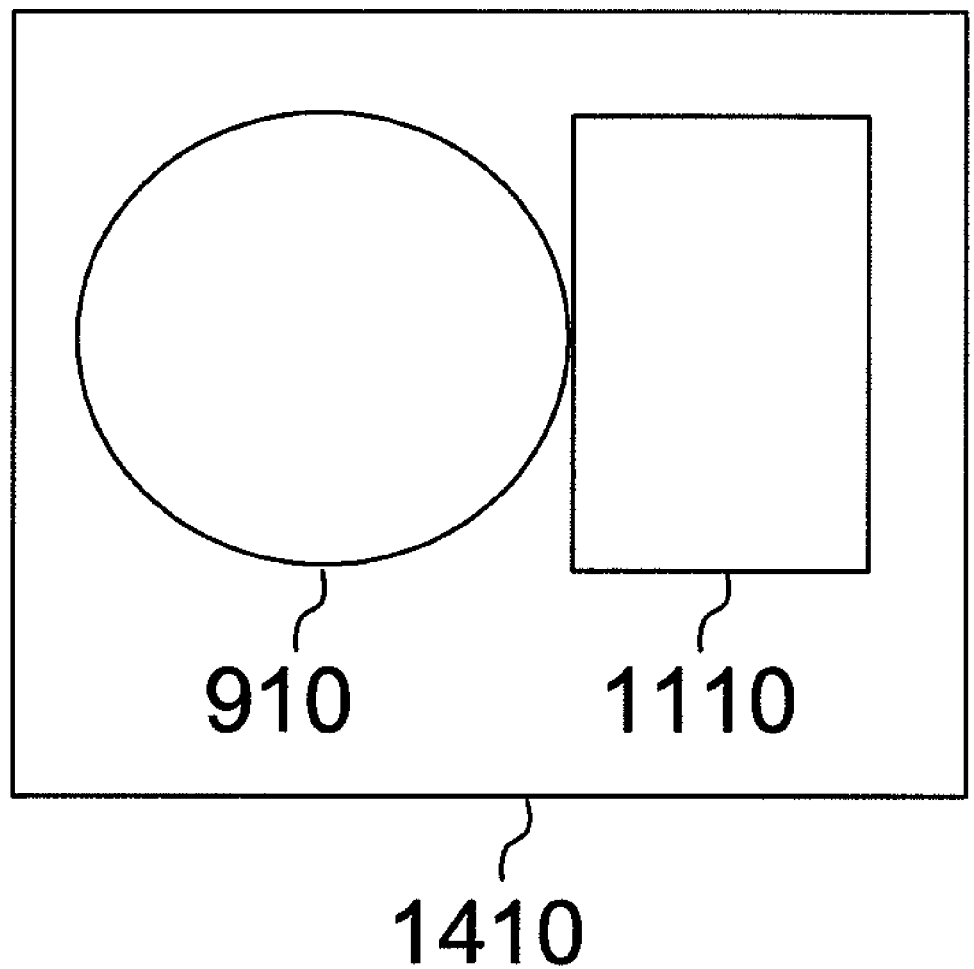
FIG. 14 (a) shows the multi-lane optical core router and the multi-lane edge router are integral parts of a router.
Figure 14:
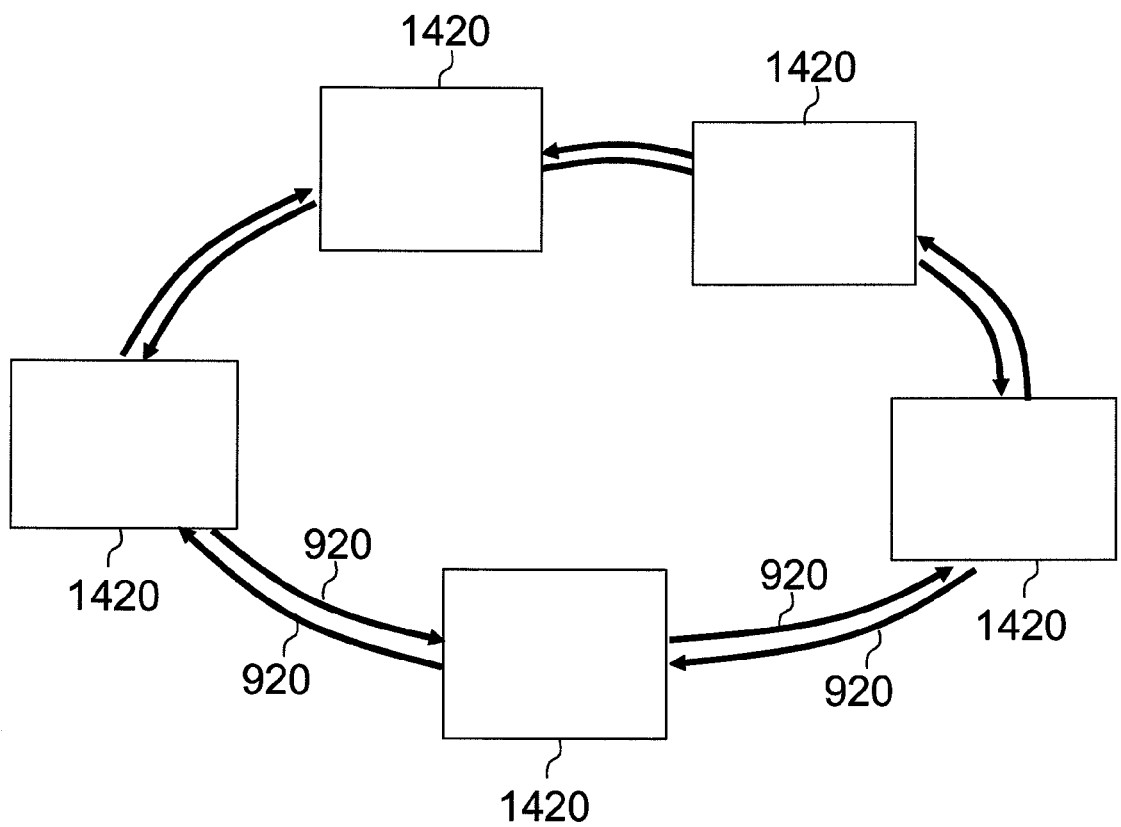

In another embodiment shown in FIG. 14 (a), multi-lane optical core router 910 and multi-lane edge router 1110 are integral parts of a multi-lane router 1410.

In another embodiment shown in FIG. 14 (b), integrated multi-lane routers 1410 are connected in ring structure using multi-lane WDM links 920.

ML-OBS core network 900 can use any specifically designed protocols, or use the preferred embodiment described as follows.

Figure 15:
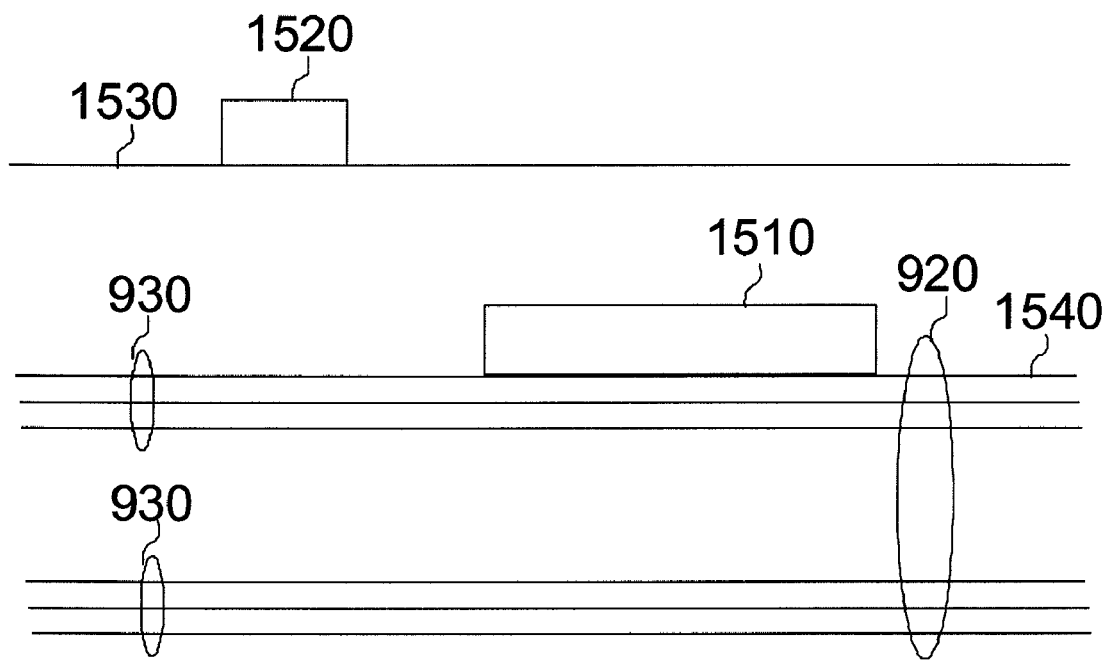
FIG. 15 shows the multi-lane control wavelength and multi-lane data wavelengths.

FIG. 15 shows the multi-lane control wavelength 1530 and multi-lane data wavelengths. Ingress multi-lane edge router 1110 receives data packets or chunks of data from incoming interfaces. Based on the destination multi-lane edge router 1110 address, and possibly along with the QoS level, data are assembled into a multi-lane data burst 1510. For each assembled multi-lane data burst 1510, a multi-lane burst header packet 1520 is generated and forwarded on a multi-lane control wavelength 1530 at an offset time ahead of its associated multi-lane data burst 1510. The multi-lane control wavelengths can be wavelengths in a separate optical fiber 600, or one or several wavelengths 210 in the WDM lanes 930. The multi-lane burst header packet 1520 carries information common to traditional OBS network 100 such as routing information, burst duration, and offset time. In addition, the multi-lane burst header packet 1520 also carries multi-lane optical burst switching network 900 specific information such as the lane identifier (ID). A multi-lane data burst 1510 can be transmitted on at least one wavelength 210 on at least one of a plurality of lanes 930.

In one embodiment, a multi-lane data burst 1510 is transmitted on a single data wavelength 1540 on a single WDM lane 930. In this case, the multi-lane burst header packet 1520 includes information about the lane ID and the wavelength ID of its associated multi-lane data burst 1510.

In another embodiment, a multi-lane data burst 1510 is transmitted on multiple multi-lane data wavelengths 1540 on a single WDM lane 930. In this case, the multi-lane burst header packet 1520 includes information about the lane ID, and the wavelength range if the wavelength IDs are consecutive, or individual wavelength IDs otherwise.

In another embodiment, a multi-lane data burst 1510 is transmitted on the same multi-lane data wavelength 1540 on multiple lanes 930. In this case, the multi-lane burst header packet 1520 includes information about the wavelength ID, the lane ID range if the lane IDs are consecutive, or individual lane IDs otherwise.

In another embodiment, a multi-lane data burst 1510 is transmitted on multiple data wavelengths 210 on multiple WDM lanes 930. In this case, the multi-lane burst header packet 1520 includes information about the wavelength range if the wavelength IDs are consecutive, or individual wavelength IDs otherwise, and the lane ID range if the lane IDs are consecutive, or individual lane IDs otherwise.

The assignment of the lane IDs and the wavelength IDs can be based on different criteria such as random select, throughput requirement, latency requirement, and destinations. The assignment of the lane IDs and wavelength IDs can be centralized or decentralized.

Figure 16:
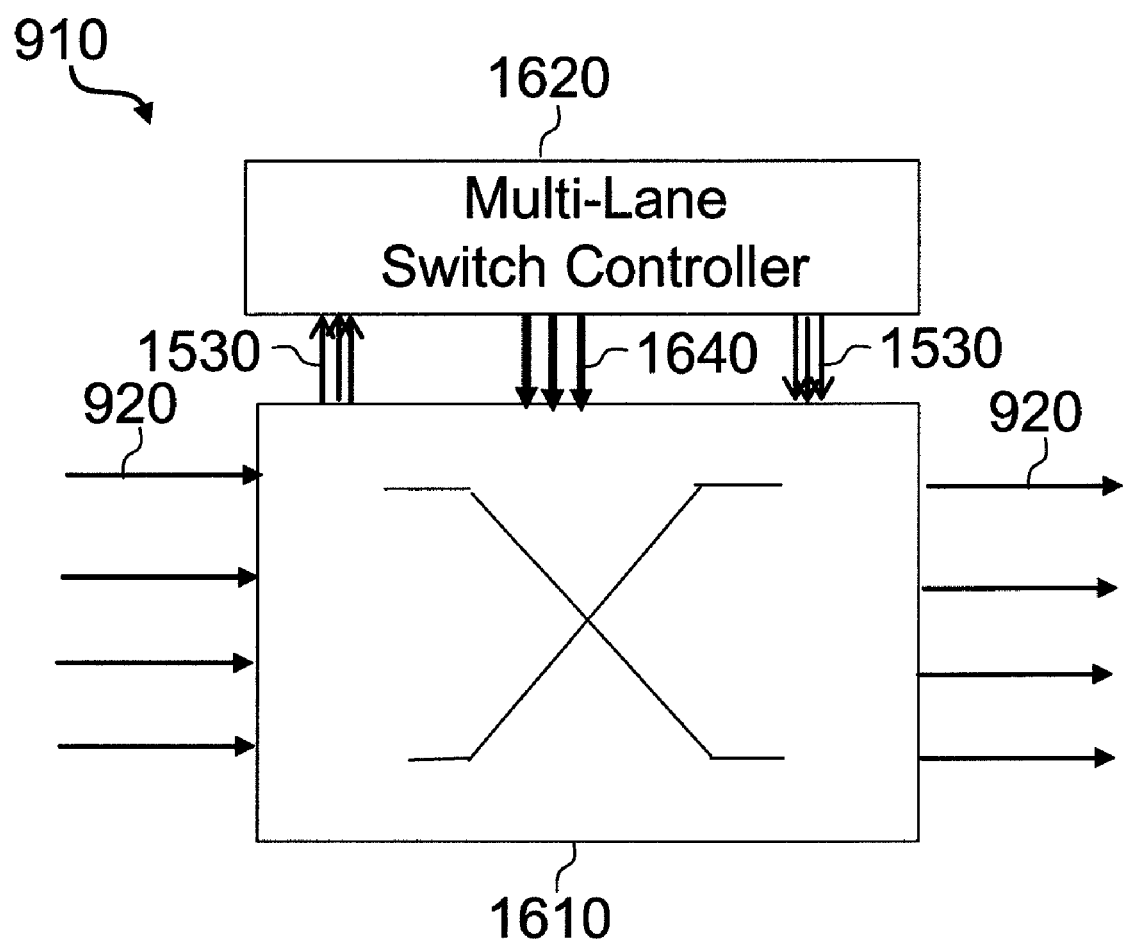
FIG. 16 shows the multi-lane optical core router architecture.

FIG. 16 shows an example block diagram of a multi-lane optical core router 910 according to the present invention. The multi-lane optical core router 910 includes a multi-lane space switching matrix 1610 and a multi-lane switch controller 1620. The multi-lane space switching matrix 1610 separates the multi-lane control wavelengths 1530 from multi-lane data wavelengths 1540, sends/receives the multi-lane control wavelengths 1530 to/from the multi-lane switch controller 1620, and routes optical signals according to the configuration commands from the multi-lane switch controller 1620.

Figure 17:
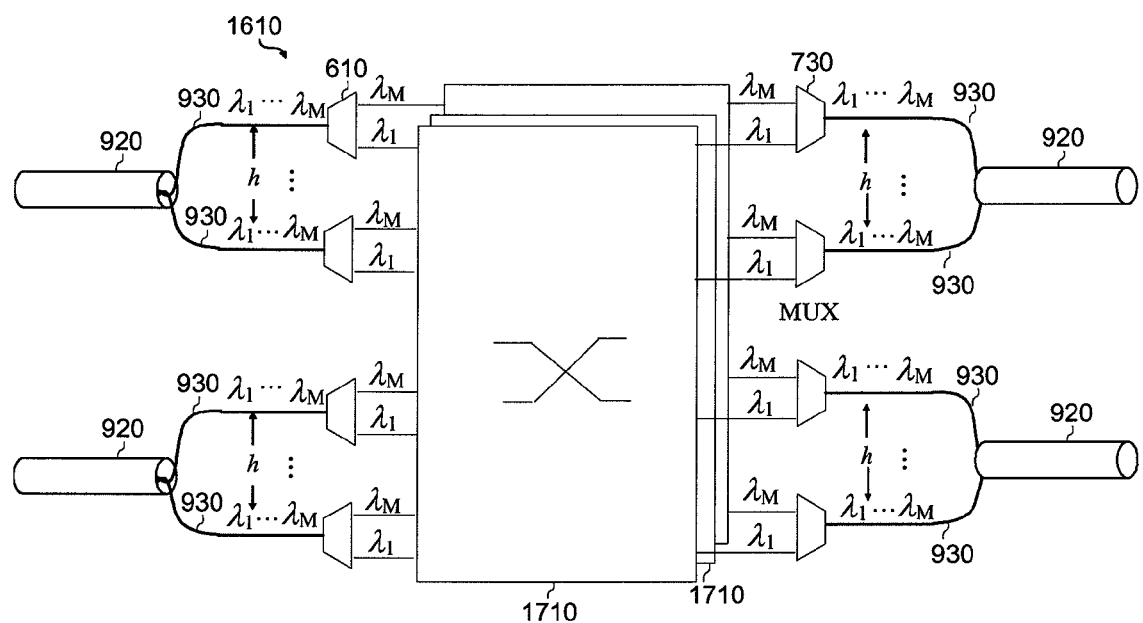
FIG. 17 shows the architecture of multi-lane space switching matrix.

There are many ways to construct the multi-lane space switching matrix 1610, as long as an incoming wavelength on an incoming lane can be switched to an outgoing lane on the same wavelength. FIG. 17 shows the preferred embodiment which uses separate optical switching planes 1710 for each individual wavelength. In this embodiment, at the input of the multi-lane optical core router 910, each lane 930 in the multi-lane WDM link 920 is fed into an optical demultiplexer 610. The optical demultiplexer 610 separates the wavelengths and sends the individual wavelengths to their corresponding optical switching planes 1710. The outputs from the optical switching planes 1710 are then combined onto the lanes 930 on the outgoing multi-lane WDM link 920. Note that in this embodiment, each wavelength is switched separately. Therefore, we can use small parallel optical switching planes 1710, rather than a large switching matrix. This further reduces the integration cost. Additional optical switching planes 1710 can be incrementally installed to support more wavelengths. Most importantly, the optical switching matrix 1610 does not need wavelength converters, making the cost of constructing a multi-lane optical core router 910 a fraction of what is needed to build a traditional OBS optical core router 110.

Figure 18:
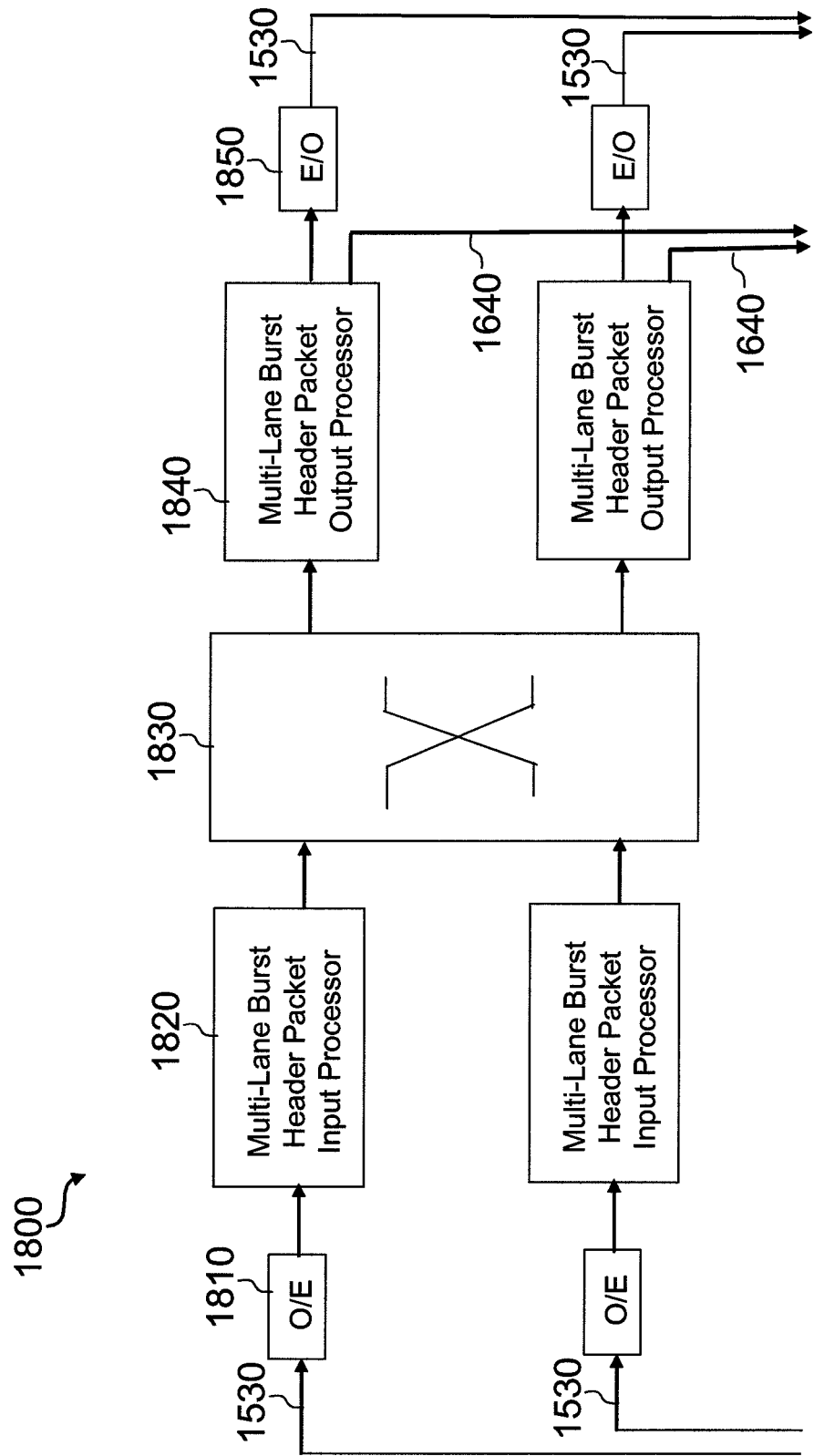
FIG. 18 (a) shows the architecture of the multi-lane switch controller.
Figure 18:
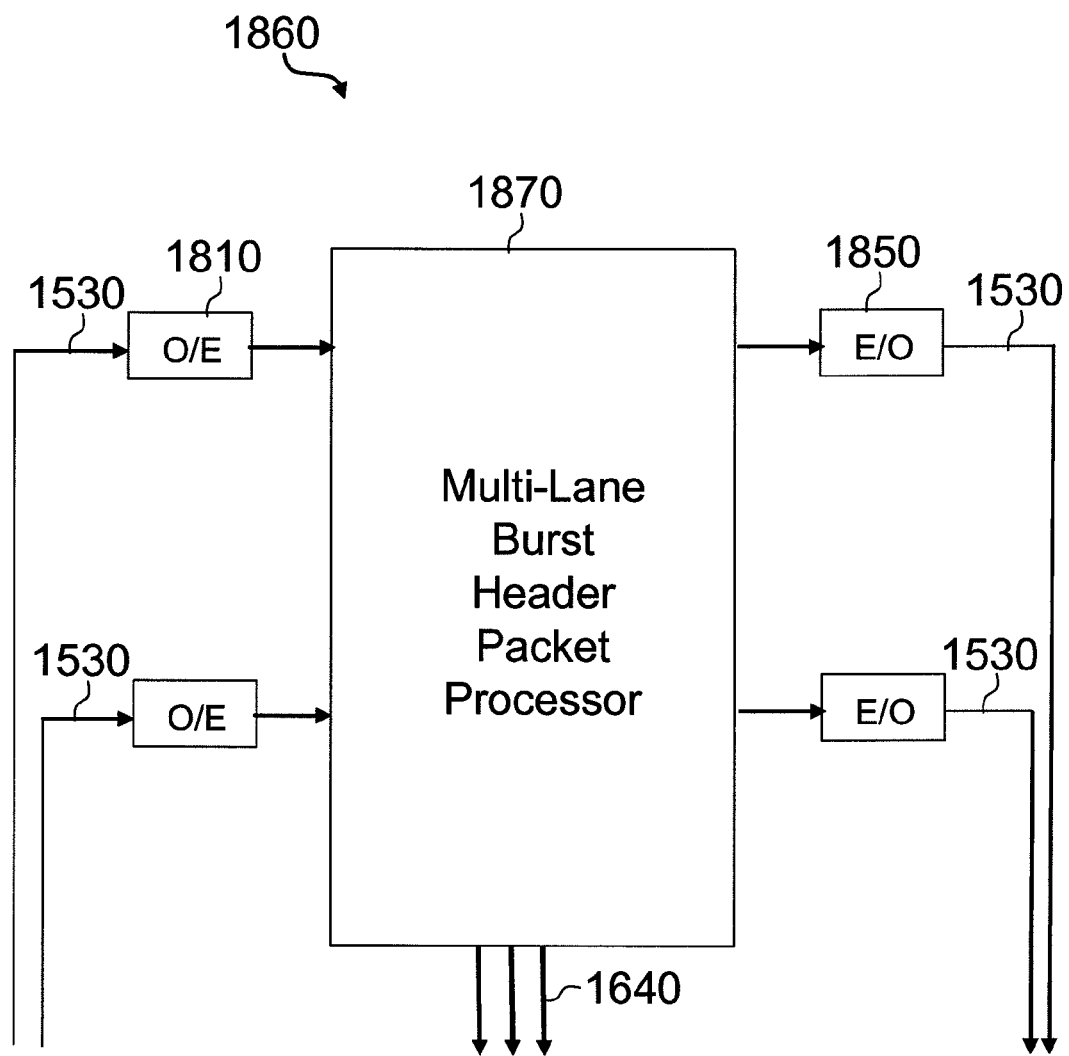

FIG. 18 (*a*) shows a first embodiment 1800 of the multi-lane switch controller 1620 according to the present invention. The multi-lane switch controller 1620 includes multiple optical to electrical (O/E) converters 1810, multiple multi-lane burst header packet input processors 1820, a switch 1830 (e.g. a cross-bar switch, a shared memory switch, or any other suitable switch), multiple multi-lane burst header packet output processors 1840, and multiple electrical to optical (E/O) converters 1850.

FIG. 18 (*b*) show another embodiment 1860 of the multi-lane switch controller 1620 where a centralized multi-lane burst header packet processor 1870 is used. The functions in the multi-lane burst header packet processors 1870 include all necessary burst header packet processing described in the distributed version. While the following descriptions discussed herein are focused on the distributed version illustrated in FIG. 18 (*a*), the scope of the specifications and the claims are in no way limited to the specific embodiments discussed herein.

When a multi-lane burst header packet 1520 traveling on the multi-lane control wavelength 1530 enters the multi-lane switch controller 1620, it first enters an O/E converter 1810 and undergoes an optical to electronic conversion. Next the multi-lane burst header packet 1520 enters the multi-lane burst header packet input processor 1820.

Figure 19:
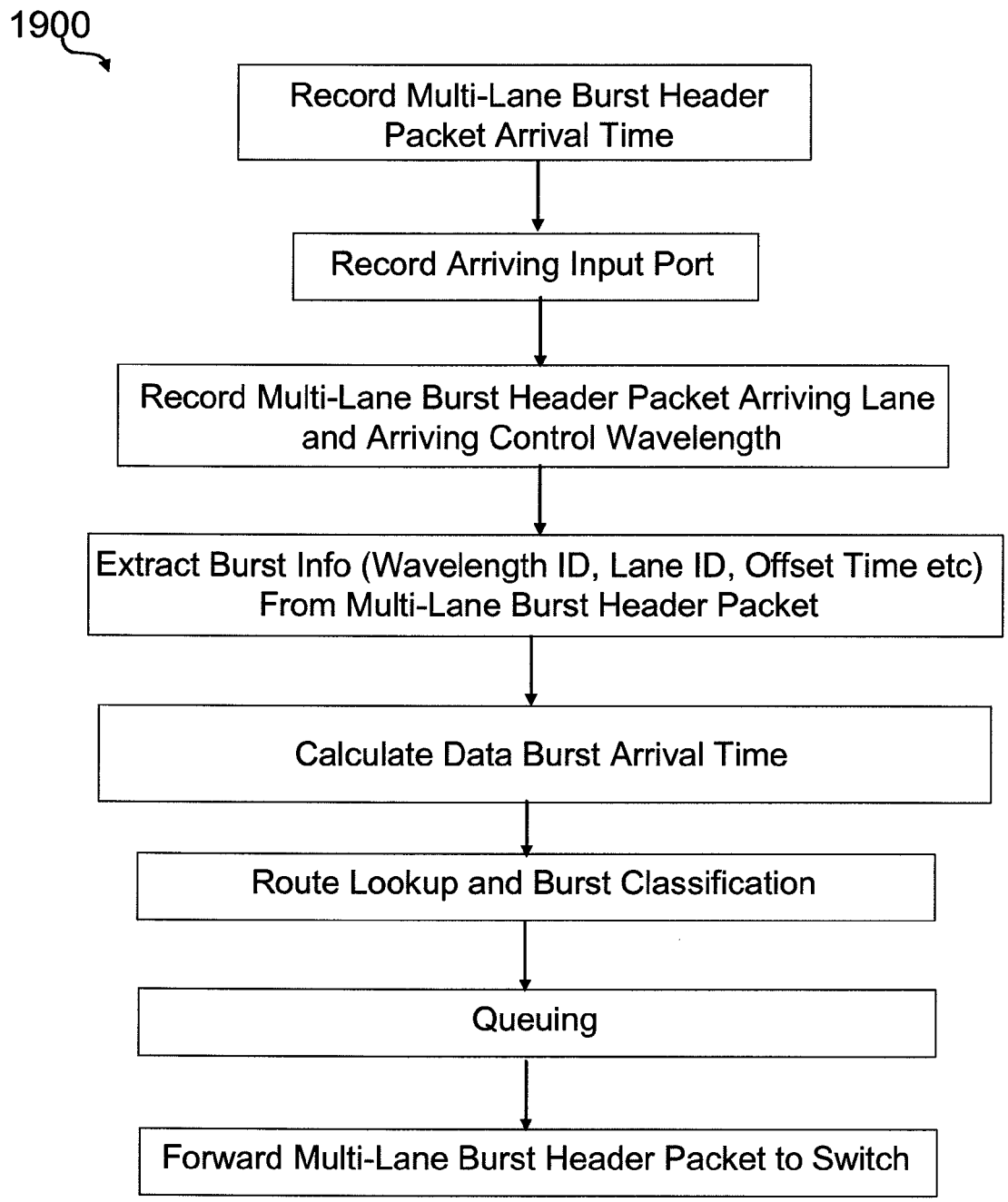
FIG. 19 shows the flow chart of the functions in the multi-lane burst header packet input processor.

The input processor flow chart 1900 shown in FIG. 19 describes the main functions performed in the multi-lane burst header packet input processor 1820. The multi-lane burst header packet input processor 1820 first record the arrival time of the multi-lane burst header packet 1520 to the multi-lane switch controller 1620. The arrival time, along with the offset time carried in the multi-lane burst header packet 1520, is used to compute the multi-lane data burst 1510 arrival time. The input port 410, the WDM lane 930 and the multi-lane control wavelength 1530 that the multi-lane burst header packet 1520 arrives on is also recorded. This information is used to configure the multi-lane space switching matrix 1610, as well as to compensate for the discrepancy between the traveling time of the multi-lane burst header packet 1520 and the multi-lane data burst 1510.

The multi-lane burst header packet input processor 1820 then extracts information from the multi-lane burst header packet 1520 about the associated multi-lane burst. Some example fields include the wavelength ID, the lane ID, the offset time, the burst length and QoS parameters.

The multi-lane data burst arrival time $T\_ba$ can be calculated as follows: $T\_ba = T\_ha + Offset - T\_adjust$, where $T\_ha$ is the recorded multi-lane burst header packet arrival time, Offset is the offset field carried in the multi-lane burst header packet 1520, and $T\_adjust$ is the traveling time difference between the multi-lane burst header packet 1520 and the multi-lane data burst 1510 due to the difference in the length of the optical fibers 600 in different WDM lanes 930, the difference in propagation speed on difference wavelengths, and any additional delay that the multi-lane burst header packet 1520 experiences in circuitry before the arrival time is recorded. If input fiber delay lines (FDLs) 640 are installed at the input port of the multi-lane optical core routers, the additional fiber delay as well as any other delay that the multi-lane data, burst 1510 experiences before it reaches the multi-lane space switching matrix 1610 should also be included in $T\_adjust$. $T\_adjust$ can be negative in value.

The multi-lane burst header packet input processor 1820 then does a route lookup and burst classification according to the routing information carried in the multi-lane burst header packet 1520. The results from the route lookup determine which output port 420 the multi-lane data burst 1510 needs to be forwarded to. In the distributed control scheme shown in FIG. 18 (*a*), each multi-lane burst header packet output processors 1840 manages the multi-lane resources for a particular output port 420. In this case, the multi-lane burst header packet 1520 needs to be sent to the corresponding multi-lane burst header packet output processors 1840 for further processing. The multi-lane burst header packet 1520 is then placed in a queue waiting to be transferred across the switch 1830 to the desired multi-lane burst header packet output processors 1840.

Figure 20:
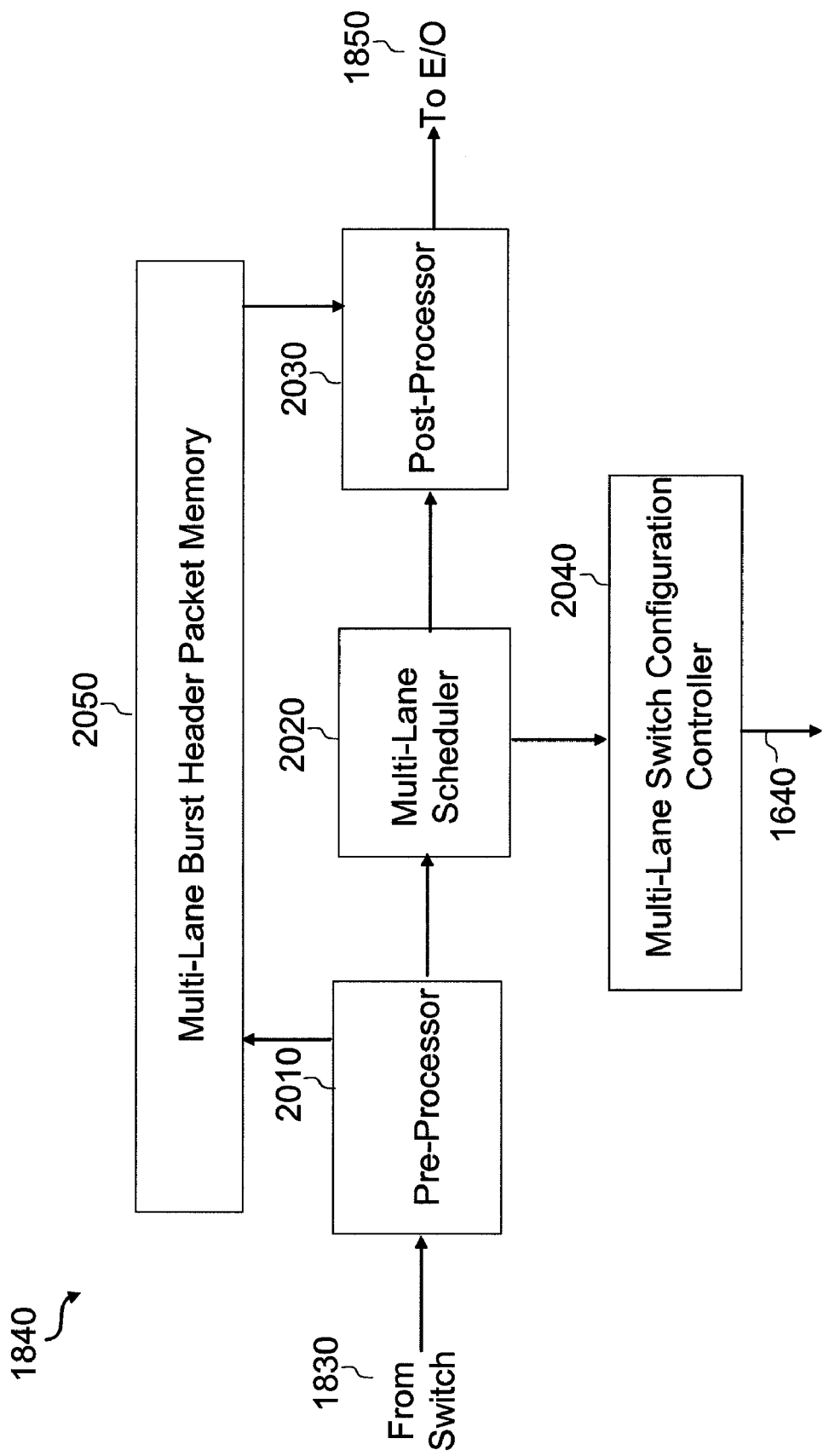
FIG. 20 shows an example block diagram of the multi-lane burst header packet output processor.

The multi-lane burst header packet output processor 1840 handles multi-lane burst scheduling and configuration of the multi-lane space switching matrix 1610. An example block diagram of the multi-lane burst header packet output processor 1840 is shown in FIG. 20.

When a multi-lane burst header packet 1520 is received from the switch 1830 by the multi-lane burst header packet output processor 1840, it first enters the pre-processor 2010. The pre-processor 2010 extracts the multi-lane data burst 1510 information from the header packet 1520, and stores the entire packet 1520 in the multi-lane burst header packet memory 2050.

The extracted multi-lane data burst 1510 information is used to generate a multi-lane burst scheduling request which is forwarded to the multi-lane scheduler 2020. The multi-lane scheduler 2020 allocate an available lane 930 on the wavelength that the multi-lane data burst 1510 is arriving on, and generates a multi-lane switch configuration request to the multi-lane switch configuration controller 2040. The multi-lane switch configuration controller 2040 uses the information in the configuration request, such as the incoming lane ID, incoming wavelength, input port, outgoing lane ID, outgoing wavelength, time to connect, and time to disconnect, to set up and tear down an optical path in the multi-lane space switch matrix 1610. The post-processor 2030 reads the multi-lane burst header packet 1520 from the packet memory 2050, modifies the corresponding fields such as the offset, outgoing lane, or the like, and sends the updated multi-lane burst header packet 1520 to the E/O converter 1850.

Figure 21:
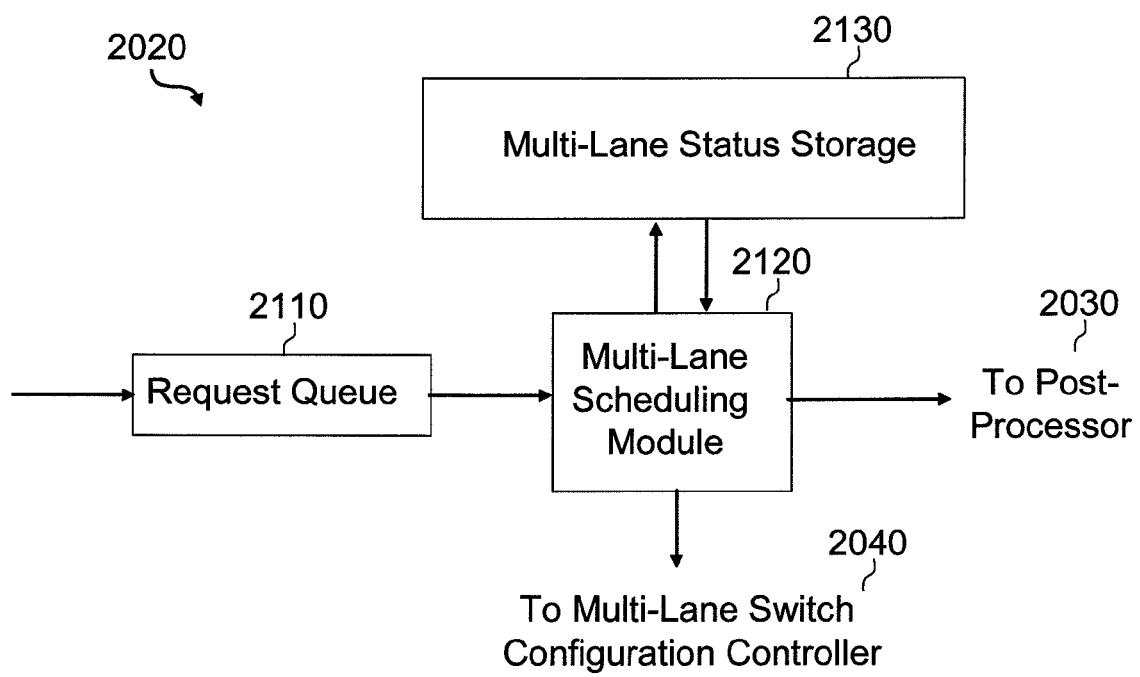
FIG. 21 shows an example block diagram of the multi-lane scheduler.

FIG. 21 shows an example block diagram of the multi-lane scheduler 2020. When a multi-lane burst scheduling request is received by the multi-lane scheduler 2020, it is first placed in a request queue 2110. Based on different objectives, the requests in the request queue can be maintained in the order that the requests arrive (FIFO order), the order that the multi-lane data burst 1510 arrive, some particular orders that support Quality-of-Service (QoS), or any other suitable order. The request queue 2110 is then accessed by the multi-lane scheduling module 2120. The multi-lane scheduling module 2120 uses the multi-lane data burst 1510 information in the scheduling request to select an outgoing lane to send the multi-lane data burst 1510. The multi-lane status storage 2130 contains information about the wavelength usage in each lane, and is used by the multi-lane scheduling module 2120 to schedule the incoming multi-lane data bursts 1510.

Figure 22:
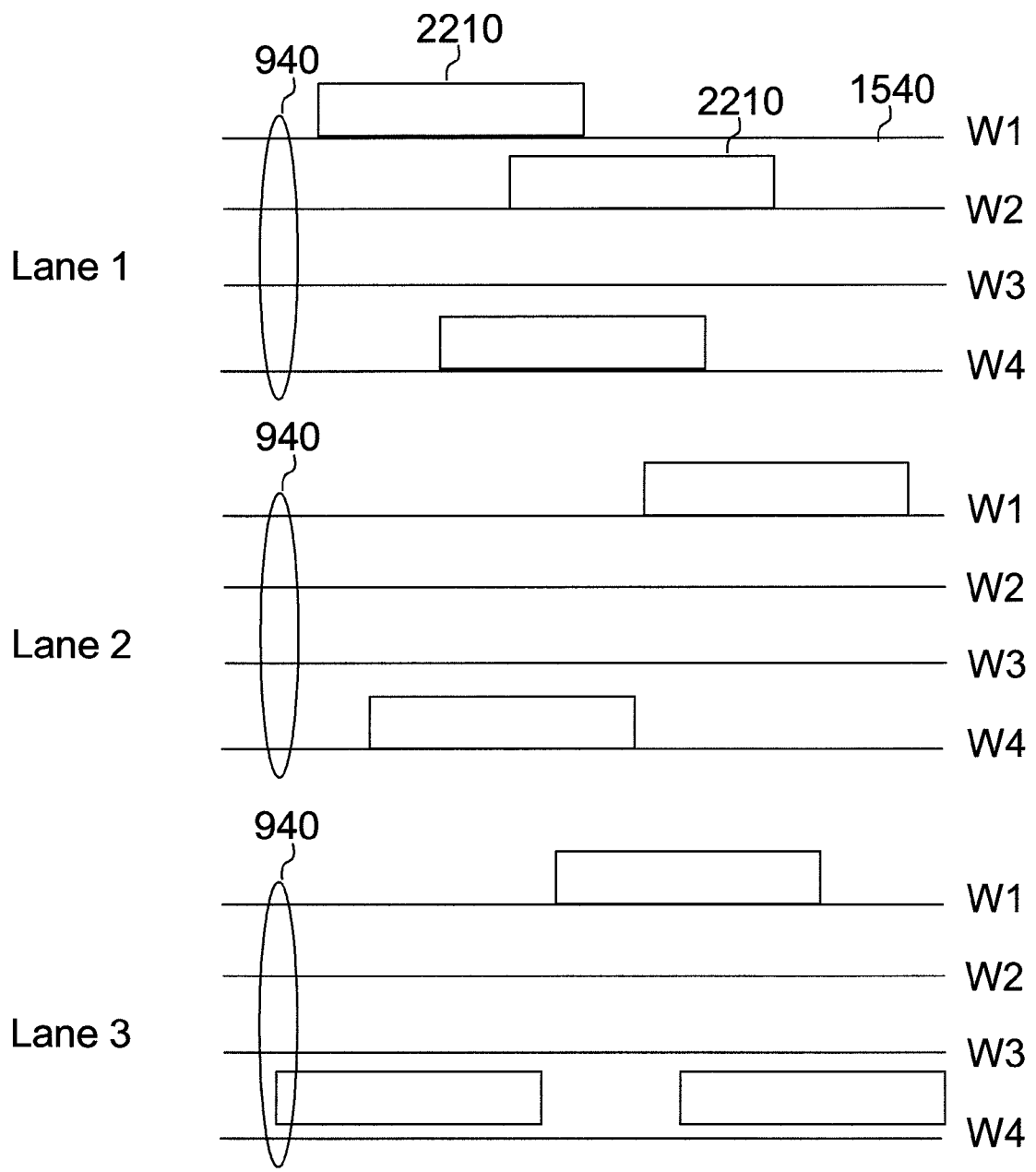
FIG. 22 is an illustration of multi-lane data wavelength usage.

FIG. 22 is an illustration of multi-lane data wavelength usage. The durations occupied by the scheduled bursts 2210 are not available for new burst scheduling requests.

Since managing a large number of wavelengths and lanes is a challenge, the present invention takes advantage of the intrinsic characteristics of the multi-lane space switching matrix 1610 and partitions the wavelengths into smaller groups according to the wavelengths.

Figure 23:
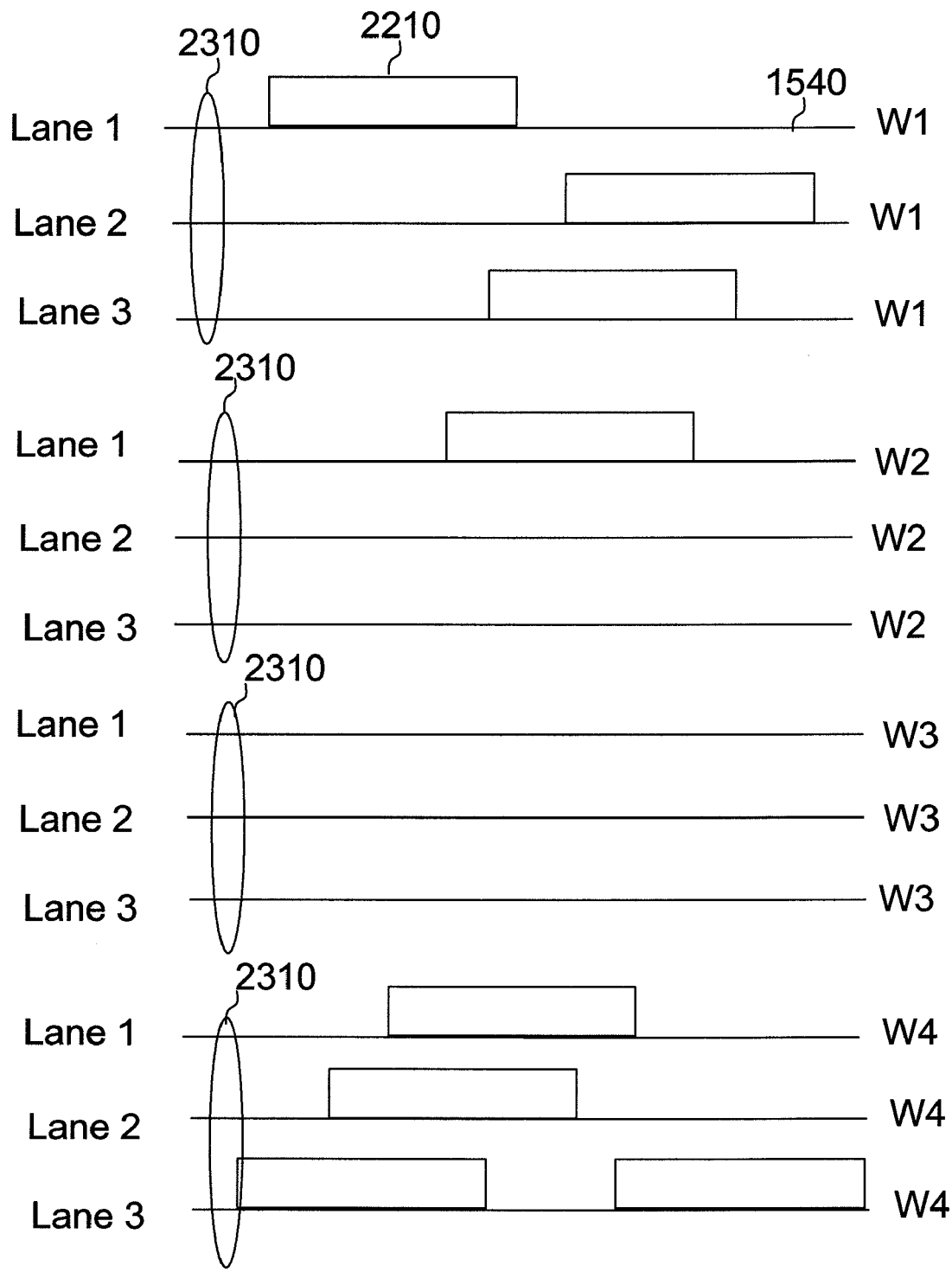
FIG. 23 illustrates multi-lane wavelength grouping.

FIG. 23 shows the result of the wavelength grouping. According to the present invention, the same wavelengths from different lanes are placed into the same wavelength group 2310. The lane status of each wavelength group 2310 is recorded in the multi-lane wavelength status storage 2410 as shown in FIG. 24.

The reason for such partitioning is explained as follows. When the multi-lane space switching matrix 1610 is not equipped with wavelength converters, an incoming multi-lane data burst 1510 can only be switched to any of the lanes 930 on the same wavelength as the one which the burst 1510 is arriving on. To find a proper lane for the incoming burst 1510, the multi-lane scheduling module only needs to search for an idle lane on that particular wavelength for the duration of the multi-lane data burst 1510. If such lane 930 is found, the burst 1510 is scheduled to be transmitted on that lane 930. If no lane 930 is available, then the burst 1510 may have been discarded or may require wavelength converters 620 and/or fiber delay lines 640 to shift the wavelength or time domain. The present invention focus on embodiments that do not use wavelength converters 620 and/or fiber delay lines 640. However, it should be noted that the present invention does not forbid the use of such components.

Figure 24:
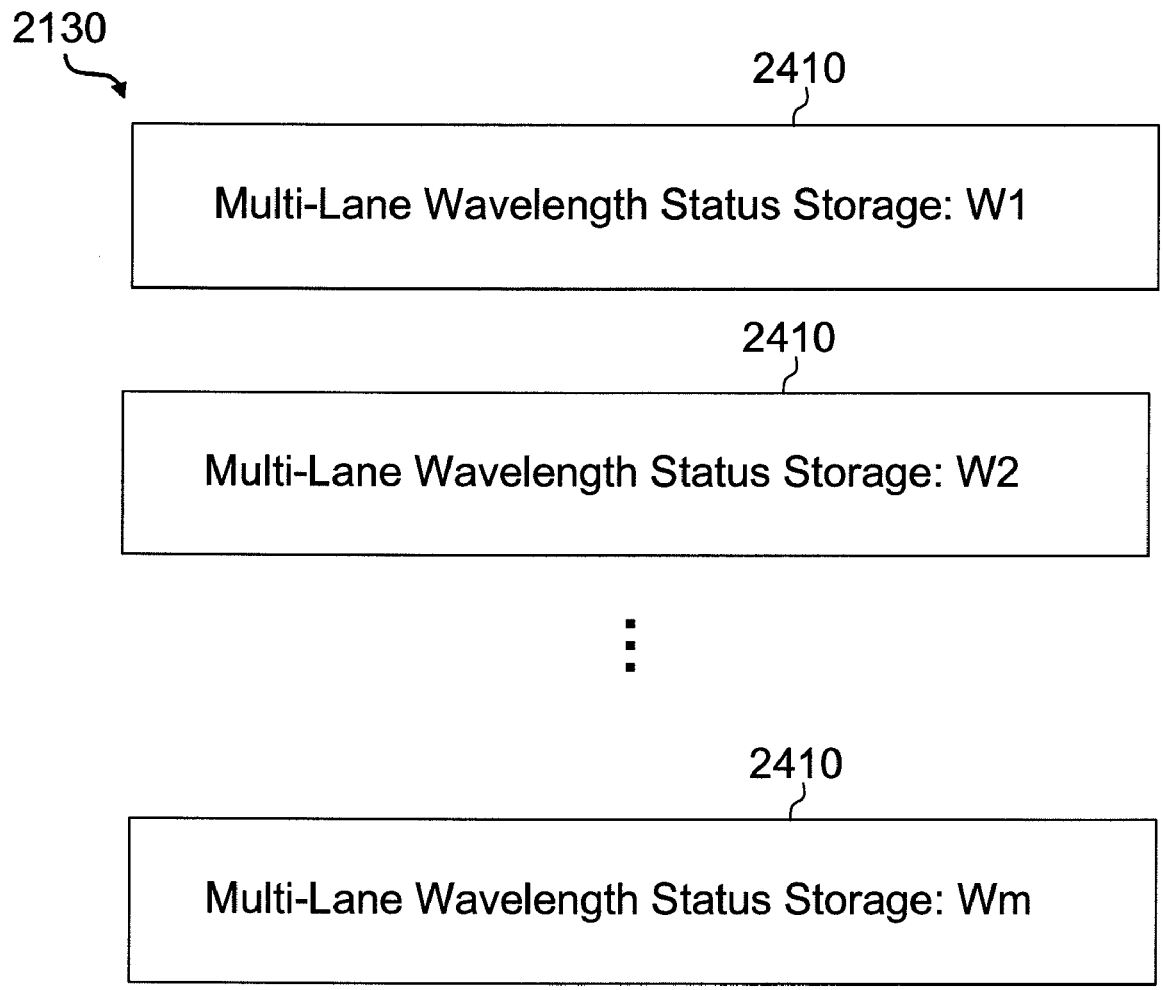
FIG. 24 shows the structure of multi-lane status storage.
Figure 25A:
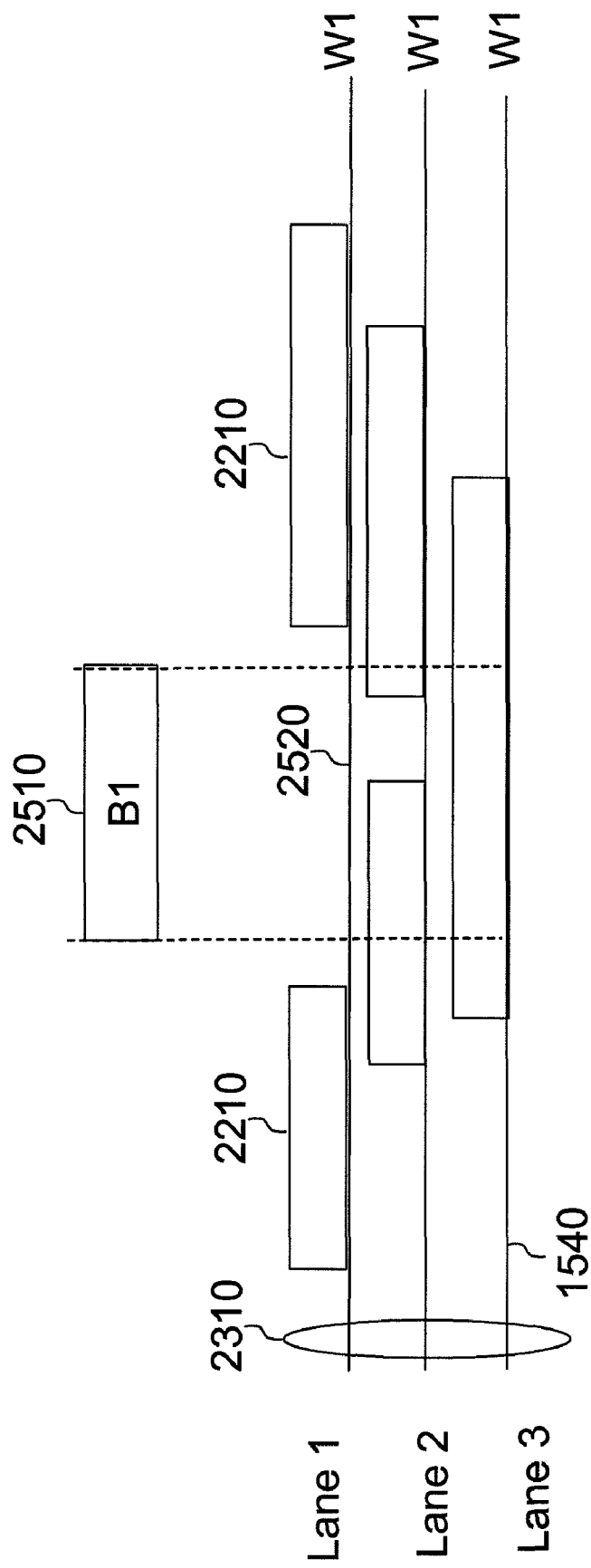
FIG. 25 (a) shows an example of scheduling a multi-lane data burst.
Figure 25B:
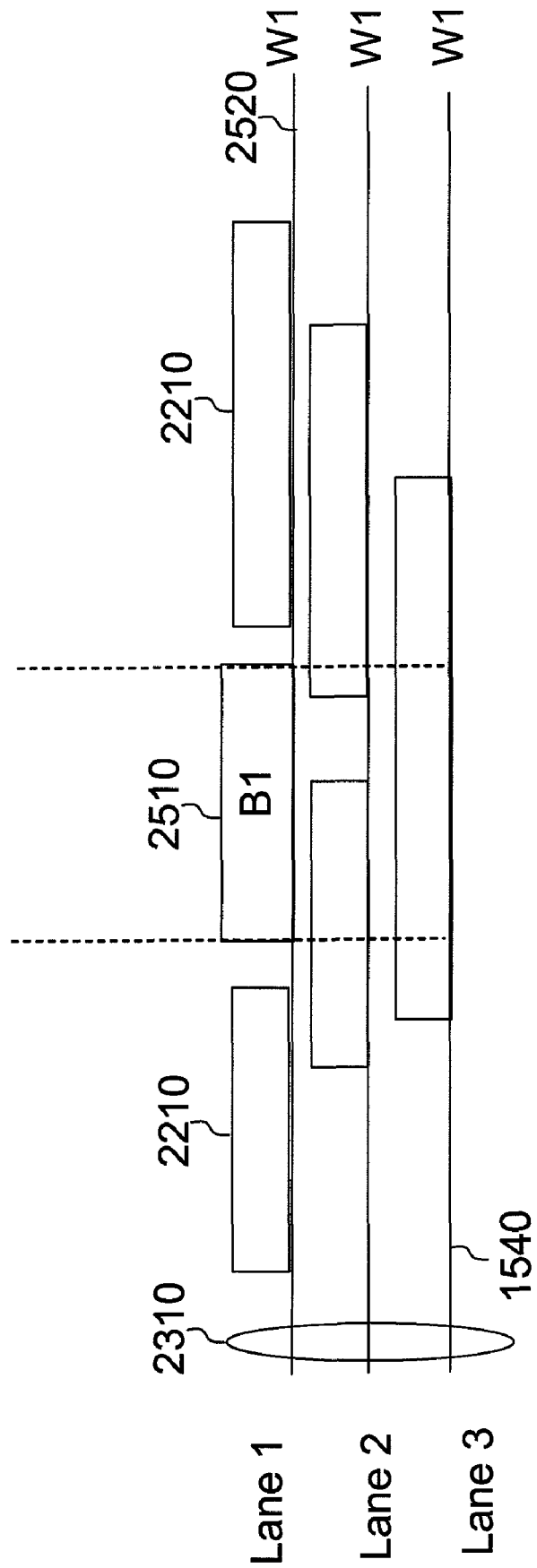
Figure 25C:
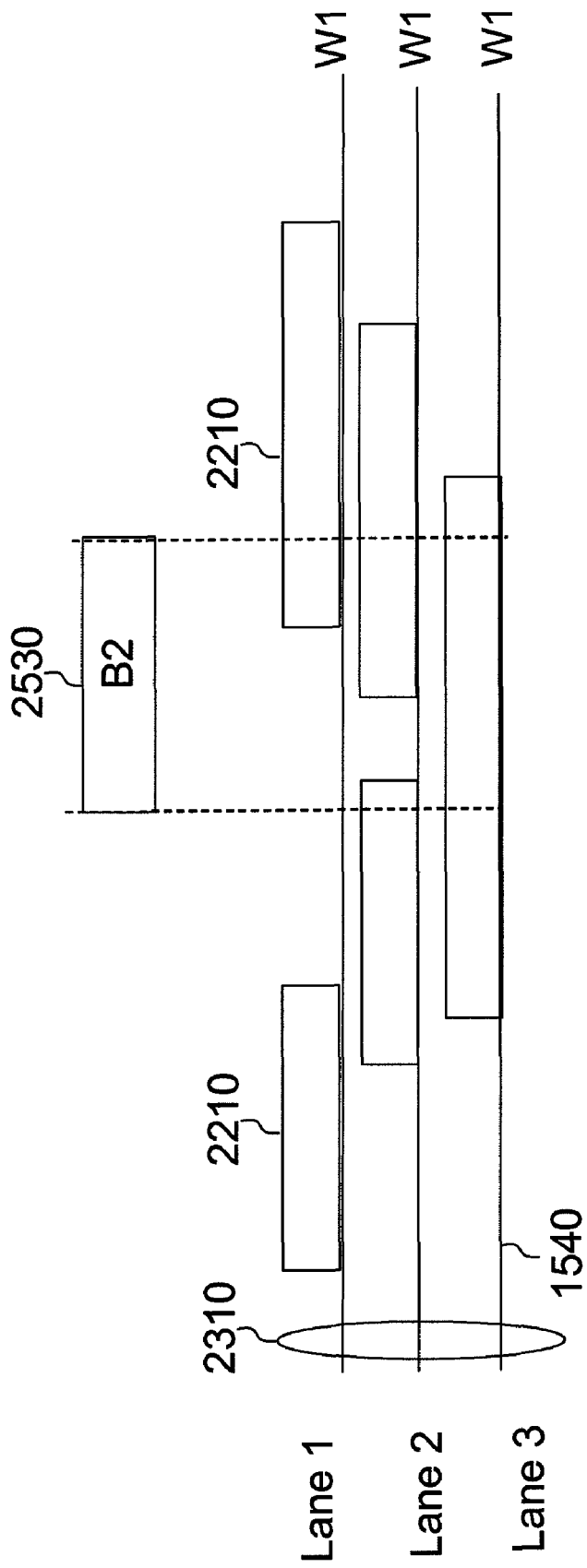
Figure 25D:
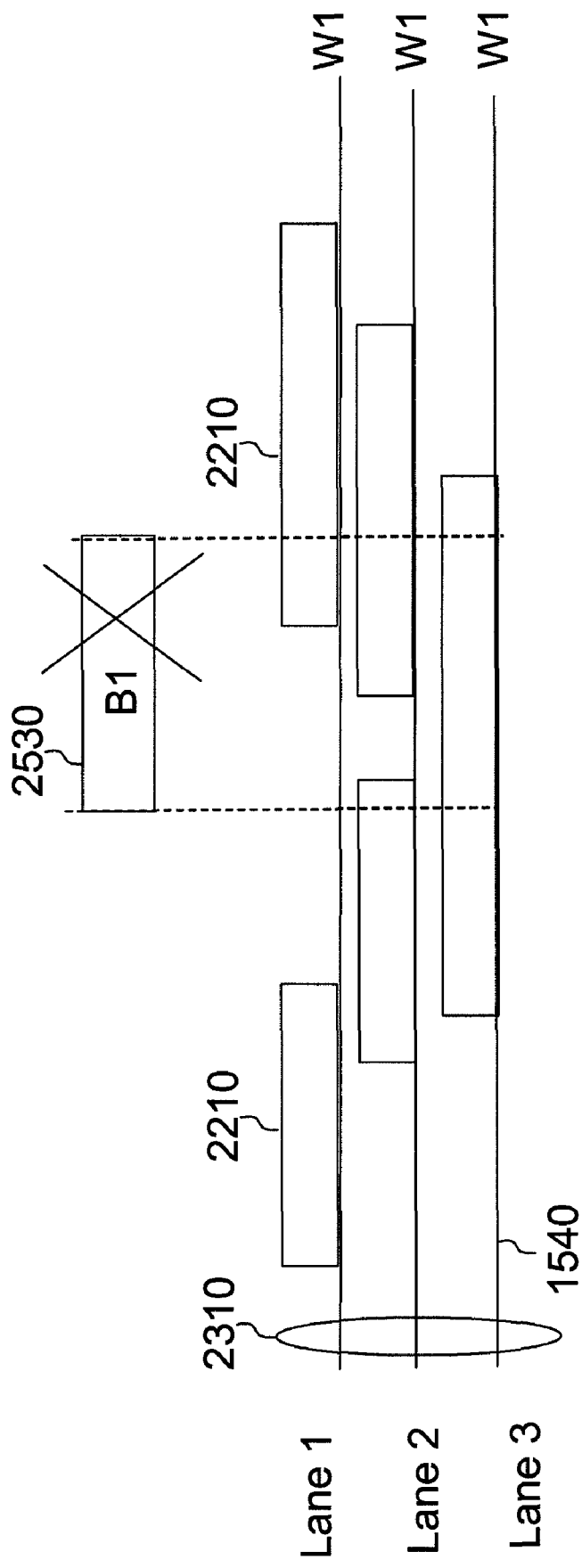

As shown in FIG. 24, the multi-lane status storage 2130 is organized as a set of multi-lane wavelength status storages 2410, each of which contains the lane 930 status of a particular multi-lane data wavelength 1540. The multi-lane wavelength status storage 2410 can be implemented using SRAM, DRAM, SDRAM or flip-flops. If the multi-lane data burst 1510 is transmitted on a single multi-lane data wavelength 1540, only the multi-lane wavelength status storage 2410 of that particular wavelength needs to be accessed. If the multi-lane data burst 1510 spans across multiple wavelengths 1540, then a subset of the multi-lane wavelength status storages 2410 needs to be accessed.

FIG. 25 (a) shows an example of scheduling data burst B1 2510 that arrival on wavelength W1. In this case, only the wavelength group for W1 needs to be accessed. Since Lane 1 2520 is available for the duration of the data burst B1 2510, B1 2510 is scheduled on Lane 1 2520 of wavelength W1 as shown in FIG. 25 (b).

FIG. 25 (c) shows an example of scheduling data burst B2 2530 that arrival on wavelength W1. Since no lane is available for the duration of B2 2530, B2 2530 is discarded as shown in FIG. 25 (d).

Figure 26:
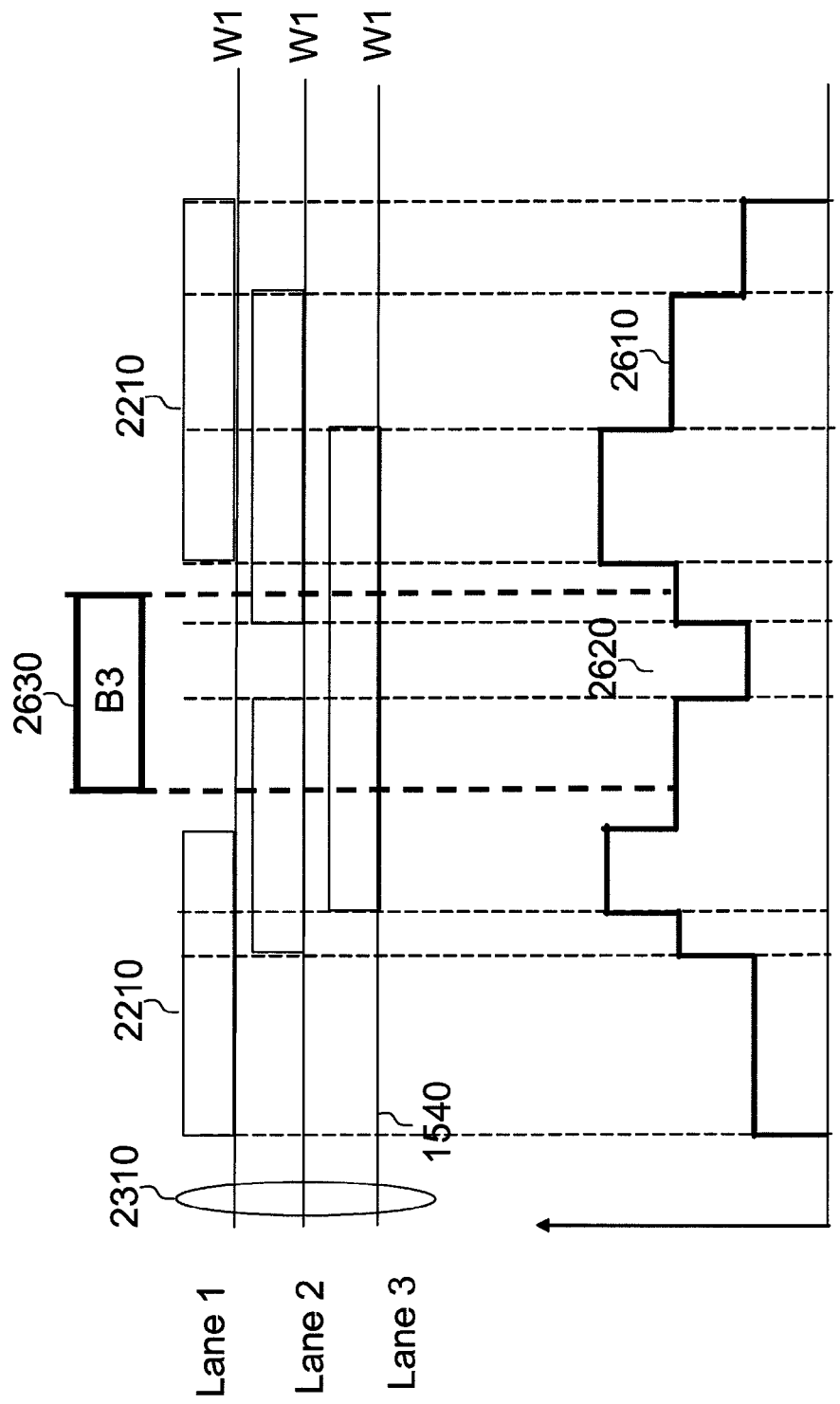
FIG. 26 (a) shows a lane usage map.
Figure 26:
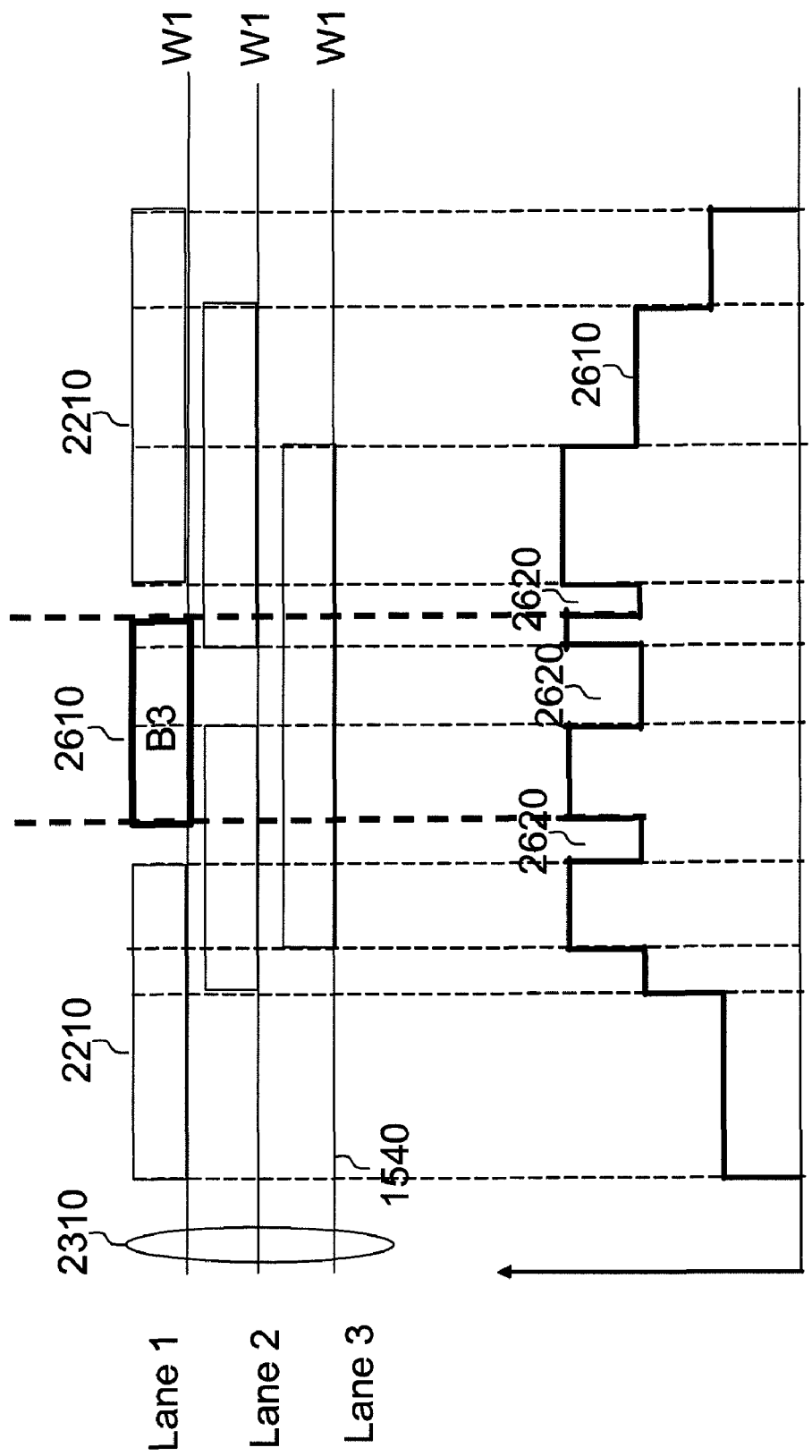
Figure 26:
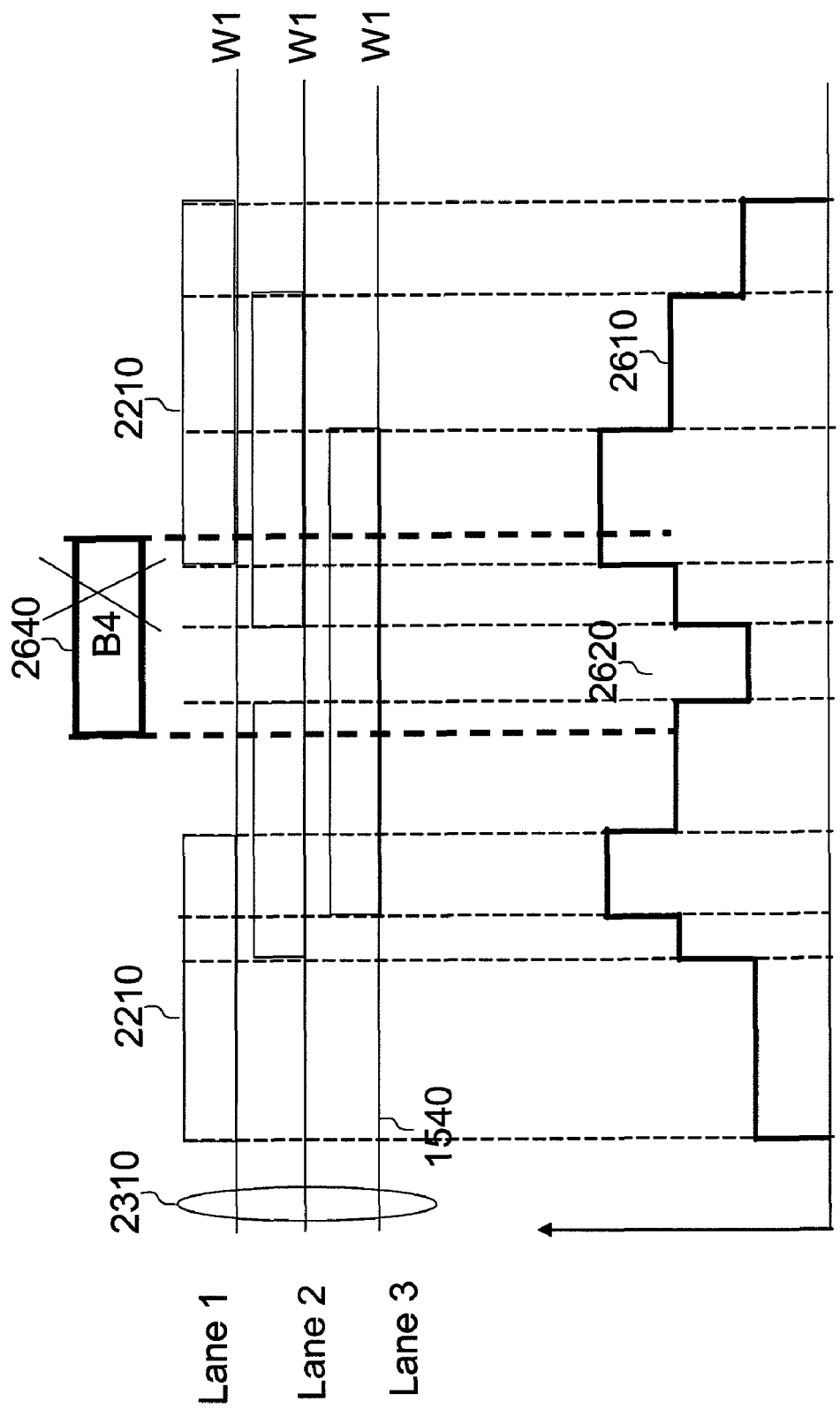

The present invention uses a novel way of managing the lane status information to allow fast efficient burst scheduling. Instead of managing individual lane status, the present invention keeps track of an aggregated lane usage map 2610 for each wavelength group 2310 as illustrated in FIG. 26 (a). The lane usage map 2610 represents the total number of lane in use for any time instance in each wavelength group 2310. The lane usage map includes a set of dips 2620, which are consecutive regions where the lane usage is below the maximum number lanes 930 in the wavelength group 2310.

The lane usage map 2610 can be used to efficiently determine if an incoming burst can be scheduled or not, and which lane 120 should be assigned to the multi-lane data burst 1510. FIG. 26 (b) shows an example of scheduling data burst B3 2630. Since the entire data burst B3 2630 fits the opening of the dip, B3 2630 can be scheduled. In this case, Lane 1 is picked as shown in FIG. 26 (c). The lane usage map 2610 is updated accordingly.

FIG. 26 (d) is another example of scheduling data burst B4 2640. Since the duration of B4 2640 does not fit in the opening of the dip 2620, no lane 930 can accommodate B4 2640. Therefore, B4 2640 is discarded as shown in FIG. 26 (e).

Figure 27:
FIG. 27 (a) shows the points that define the dip in the lane usage map.
Figure 27:
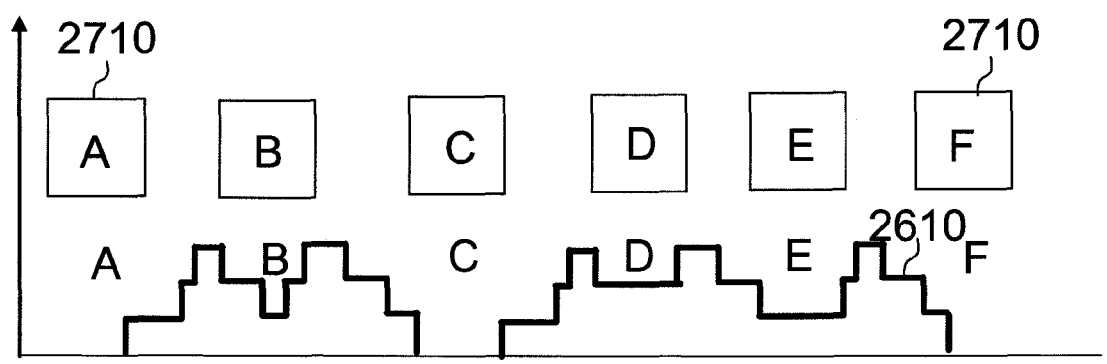

The dip 2620 is characterized by the beginning time and ending time of the lane usage level as shown in FIG. 27 (a). FIG. 27 (b) shows an example data structure of a mini dip table 2710 which can record the information about a single dip 2620. FIG. 27 (c) illustrates how a complete lane usage map 2610 can be recorded using a set of mini dip tables 2710.

Figure 28:
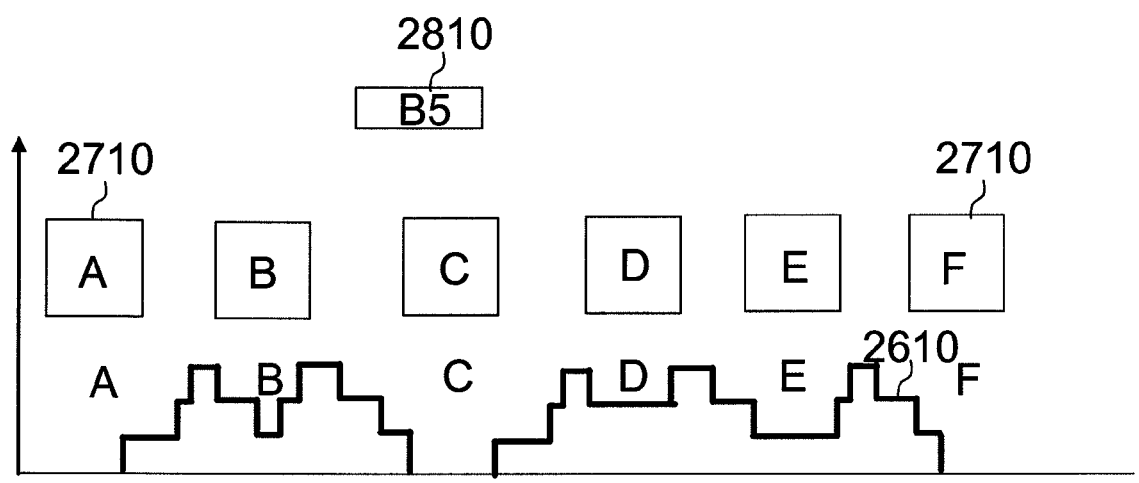
FIG. 28 (a) shows an example of scheduling a multi-lane data burst using the mini dip tables.
Figure 28:
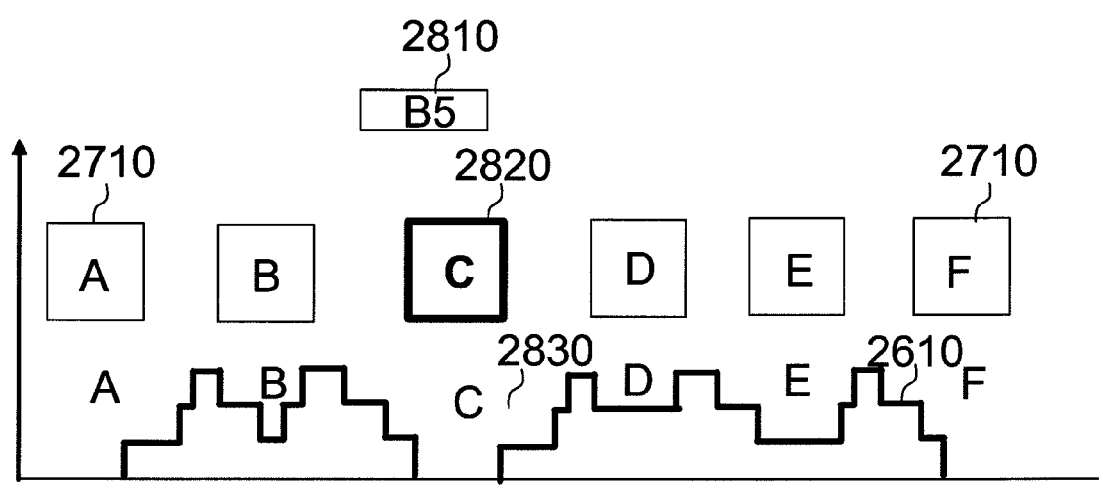

FIG. 28(a) illustrates that data burst B5 2810 needs to be scheduled using the lane usage map. As shown in FIG. 28 (b) since the beginning time of B5 2810 falls into dip C 2830, only mini dip table C 2820 needs to be accessed to determine if B5 2810 can be scheduled, and if yes, which lane 930 can be assigned to burst B5 2810.

Note that the lane usage map is stored in some storage elements such as SRAM, DRAM, SDRAM, flip flop, or the like. The storage elements are accessed by some triggering events such as a match in the wavelengths, a match in time duration, a clock, and/or some other external events. When a burst is scheduled on the lane, the lane usage map 2610 is updated by updating at least one of the mini dip tables 2710. When a new dip 2620 is created, an additional mini dip table 2710 is needed to record the information about the dip 2620. When a dip 2620 becomes too small to be useful (such as fitting a minimum size burst), the mini dip table 2710 that represents such dip 2620 can be recycled. The mini dip table 2710 can be statically or dynamically managed. For fast access to the mini dip table 2710, some indexing mechanisms can be used. One embodiment of the indexing mechanism is a tree structure. Another embodiment of the indexing mechanism is to use summary bits. The pointer to the storage location is calculated based on some triggering event such as a scheduling request, the transmission request, a clock, or external events. The calculated pointer is used to read some storage locations to make a decision. The decision may also trigger some events that cause a second pointer to be calculated. The second pointer is used to access and possibly modify data in some storage locations. The storage locations are dynamically managed and can be reconfigured for new use. Since the data stored in the storage locations represent are time sensitive, old data entries that represent past time are of no use, and, therefore, are recycled into the free entry list.

The above discussion of the invention is directed to multi-lane optical burst switching network. It should be noted, however, the invention is applicable to other types of networks, including traditional optical burst switching network, reconfigurable wavelength routed network, optical packet switching network, and electronically switched packet networks. The multi-lane optical space switching matrix 1610 can be replaced with a electrically switched crossbar switch. The invention discussed above, including the separate switching planes for each wavelength, allows more switching planes to be incrementally deployed to allow for more wavelengths as demand increases. The methods for wavelength grouping and the lane usage map are applicable to other systems that allow for subgroup partitioning such as routers using limited range wavelength converters 720, and DRAM banks. Although the burst scheduling method disclosed in the invention is designed for scheduling within a wavelength group, it is directly applicable to the burst scheduling problem in traditional optical burst switching network. The present invention is also applicable to Wide Area Network (WAN), Virtual Private Network (VPN), cloud computing, storage area network, optical backplane, multi-processor, and blade server communication. The present invention is also applicable to systems that require resource allocation.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

From the foregoing detailed description of specific embodiments of the invention, it should be apparent that a system for optical switching that is novel has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A method for multi-wavelength switching, the method comprising:
   receiving a plurality of signals through at least one input port;
   separating the plurality of said signals into at least one wavelength signal set based on wavelengths, wherein a first wavelength signal set of said at least one wavelength signal set corresponds to a first wavelength;
   providing a plurality of output lanes to at least one output port;
   determining if two signals from said first wavelength signal set traveling on said first wavelength are scheduled for output from an output port of said at least one output port during an overlapping time period through said plurality of output lanes; and
   determining if one of said plurality of output lanes is available during said overlapping time period when said two signals are scheduled for said output port during the overlapping time period, wherein a first signal of said two signals is routed for output on an available lane if one of said plurality of output lanes of said output port is available.

2. The method of claim 1, wherein said first signal of said two signals is routed to said available lane of said output port on said first wavelength.

3. The method of claim 1, wherein each of said plurality of output lanes supports at least one wavelength.

4. The method of claim 1 further comprising:
   modifying an original control signal corresponding to said first signal to create a modified control signal, wherein said modified control signal is altered to indicate that said first signal is routed for said output port on said available lane.

5. The method of claim 4, wherein said original control signal arrives on a different wavelength of said wavelengths than said first signal.

6. The method of claim 4, wherein said original control signal arrives ahead of said first signal.

7. The method of claim 4, wherein said original control signal provides information indicating a length of said first signal.

8. The method of claim 1 further comprising:
   discarding said first signal if none of said plurality of output lanes of said output port is available during said overlapping time period.

9. The method of claim 1 further comprising:
   discarding said first signal if none of said plurality of output lanes of said output port is available on said first wavelength during said overlapping time period.

10. The method of claim 1, wherein said first signal is obtained by assembling packets into data bursts at an ingress router based on common egress router address.

11. The method of claim 1, wherein no all-optical wavelength converters are utilized to provide optical multi-wavelength switching.

12. A method for multi-wavelength switching, the method comprising:
   receiving a control signal corresponding to a data signal scheduled to arrive on a first wavelength through at least one input port;
   providing a plurality of output lanes to at least one output port;
   supporting at least one output wavelength on said plurality of output lanes;
   maintaining status information on said plurality of output lanes for said at least one output wavelength;
   determining a destination output port for said data signal based on routing information in said control signal;
   determining if one of said plurality of output lanes of said destination output port is available for an overlapping time with said data signal;

selecting an available lane if one of said plurality of output lanes of said destination output port is available for said overlapping time; and routing said data signal to said selected output lane of said destination output port.

13. The method of claim 12, wherein said available lane of said destination output port carries said data signal on said first wavelength, and said data signal is dropped if none of said plurality of output lanes of said destination output port are available for said overlapping time with said data signal.

14. The method of claim 12, wherein said control signal is a burst header packet, and said data signal is a burst in an optical burst switching network.

15. A system for multi-wavelength switching, the system comprising:
 at least one input port, wherein a plurality of input signals are provided through said input port;
 at least one output port comprising of a plurality of output lanes;
 at least one demultiplexer (DMUX), wherein said at least one DMUX separates said plurality of input signals into at least one wavelength signal set based on wavelengths, wherein a first wavelength signal set of said at least one wavelength signal set corresponds to a first wavelength;
 a switch fabric routing said plurality of input signals;
 a switch controller coupled to said switch fabric, said switch controller determining if contention is present for said first wavelength signal set, contention arising when two signals from said first wavelength set traveling on said first wavelength are scheduled for output during an overlapping time period through a first output port of said at least one output port, said switch controller determining if one of said plurality of output lanes of said first output port is available during said overlapping time period if contention is present for said first wavelength signal set, and a first signal of said two signals is routed for output on an available lane if one of said plurality of output lanes of said first output port is available; and
 at least one multiplexer (MUX), wherein said at least one MUX combines signals scheduled for output on said plurality of output lanes into a modified signal set, wherein said modified signal set is output through said first output port.

16. The system of claim 15, wherein no all-optical wavelength converters are used in said system.

17. The system of claim 15, wherein said switching fabric comprises:
 a plurality of switching plane sets, wherein each of said plurality of switching plane sets routes one of said at least one wavelength signal set to said at least one output port.

18. The system of claim 15, wherein said switch controller processes a first control signal corresponding to said first signal, wherein said first control signal provides routing information for said first signal; said switch controller allocates said available lane for said first signal and sets up said switch fabric to route said first signal to said available lane, and said switch controller modifies fields in said first control signal to indicate that said first signal is transmitted through said available lane.

19. The system of claim 15, wherein said switch controller further comprises memory storage for storing status information for each of a plurality of wavelengths supported by said at least one output port, and said status information indicates availability for said plurality of output lanes provided by said at least one output port.

20. The system of claim 15, wherein no all-optical wavelength converters are utilized to provide optical multi-wavelength switching.

* * * * *